US009765723B2

(12) United States Patent
Imai et al.

(10) Patent No.: US 9,765,723 B2
(45) Date of Patent: Sep. 19, 2017

(54) FUEL INJECTION CONTROL DEVICE AND FUEL INJECTION SYSTEM

(71) Applicant: DENSO CORPORATION, Kariya, Aichi-pref. (JP)

(72) Inventors: Keita Imai, Kariya (JP); Hiroaki Nagatomo, Kariya (JP); Eiji Itoh, Anjo (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 14/787,327

(22) PCT Filed: May 9, 2014

(86) PCT No.: PCT/JP2014/002457
§ 371 (c)(1),
(2) Date: Oct. 27, 2015

(87) PCT Pub. No.: WO2014/181549
PCT Pub. Date: Nov. 13, 2014

(65) Prior Publication Data
US 2016/0061139 A1    Mar. 3, 2016

(30) Foreign Application Priority Data

May 10, 2013  (JP) ................................. 2013-100300
May 10, 2013  (JP) ................................. 2013-100302

(51) Int. Cl.
*F02D 41/24*     (2006.01)
*F02D 41/30*     (2006.01)
(Continued)

(52) U.S. Cl.
CPC ......... *F02D 41/3005* (2013.01); *F02D 41/20* (2013.01); *F02D 41/247* (2013.01);
(Continued)

(58) Field of Classification Search
CPC .... F02D 41/3005; F02D 41/20; F02D 41/247; F02D 41/3086; F02D 41/40; F02M 59/20
(Continued)

(56) References Cited

U.S. PATENT DOCUMENTS 6,279,873 B1     8/2001  Eichendorf et al.
6,302,080 B1 *  10/2001  Kato ................... F02D 41/3827
                                                              123/295
(Continued)

FOREIGN PATENT DOCUMENTS

JP         10-274076      10/1998
JP         2000-337223    12/2000
(Continued)

OTHER PUBLICATIONS

International Search Report for PCT/JP2014/002457, mailed Jun. 24, 2014, 5 pages.
(Continued)

*Primary Examiner* — Mahmoud Gimie
(74) *Attorney, Agent, or Firm* — Nixon & Vanderhye P.C.

(57) ABSTRACT

A fuel injection control device is adapted for a fuel injection system including an injector and a high-pressure pump that raises pressure of fuel and supplies the fuel to the injector. The fuel injection control device includes a selecting unit for selecting by which one of full lift injection and partial injection to inject fuel, and a pump control unit for controlling operation of the high-pressure pump such that a pressure of fuel supplied to the injector coincides with a target pressure. The selecting unit selects the partial injection when a required injection quantity of fuel is equal to or smaller than a partial maximum injection quantity. A fuel injection system includes the fuel injection control device, the injector, and the high-pressure pump.

25 Claims, 12 Drawing Sheets

(51) Int. Cl.
  *F02D 41/20* (2006.01)
  *F02D 41/38* (2006.01)
  *F02D 41/40* (2006.01)
  *F02M 61/18* (2006.01)
  *F02M 59/20* (2006.01)
  *F02M 61/04* (2006.01)
  *F02M 63/00* (2006.01)
  *F02M 51/06* (2006.01)
  *F02M 59/10* (2006.01)

(52) U.S. Cl.
  CPC ..... *F02D 41/3082* (2013.01); *F02D 41/3845* (2013.01); *F02D 41/40* (2013.01); *F02D 41/401* (2013.01); *F02M 51/0671* (2013.01); *F02M 51/0685* (2013.01); *F02M 59/20* (2013.01); *F02M 61/04* (2013.01); *F02M 61/18* (2013.01); *F02M 61/1846* (2013.01); *F02M 61/1853* (2013.01); *F02M 63/0019* (2013.01); *F02M 63/0021* (2013.01); *F02D 2041/2055* (2013.01); *F02D 2200/0602* (2013.01); *F02D 2200/0616* (2013.01); *F02D 2250/31* (2013.01); *F02M 59/102* (2013.01); *F02M 2200/08* (2013.01); *Y02T 10/44* (2013.01)

(58) Field of Classification Search
  USPC .................................. 123/294, 295
  See application file for complete search history.

(56) References Cited

U.S. PATENT DOCUMENTS

| | | |
|---|---|---|
| 7,000,600 B1 | 2/2006 | Yamada et al. |
| 2011/0155105 A1 | 6/2011 | Sukegawa et al. |
| 2012/0152205 A1 | 6/2012 | Matsumura |
| 2012/0216783 A1 | 8/2012 | Kusakabe et al. |
| 2012/0318883 A1 | 12/2012 | Kusakabe et al. |

FOREIGN PATENT DOCUMENTS

| | | |
|---|---|---|
| JP | 2001-153003 | 6/2001 |
| JP | 2001-280189 | 10/2001 |
| JP | 2003-074403 | 3/2003 |
| JP | 2003-269289 | 9/2003 |
| JP | 2007-107459 | 4/2007 |
| JP | 2007-132249 | 5/2007 |
| JP | 2008-045519 | 2/2008 |
| JP | 2009-185741 | 8/2009 |
| JP | 2009-299494 | 12/2009 |
| JP | 2010-532448 | 10/2010 |
| JP | 2012-77665 | 4/2012 |

OTHER PUBLICATIONS

Written Opinion of the ISA for PCT/JP2014/002457, mailed Jun. 24, 2014, 6 pages.

Office Action (1 page) dated Aug. 4, 2015 issued in corresponding Japanese Application No. 2013-100300 and English translation (2 pages).

\* cited by examiner

FUEL INJECTION CONTROL DEVICE AND FUEL INJECTION SYSTEM

CROSS REFERENCE TO RELATED APPLICATIONS

This application is the U.S. national phase of International Application No. PCT/JP2014/002457 filed 9 May 2014, which designated the U.S. and claims priority to Japanese Patent Application No. 2013-100302 filed on May 10, 2013 and Japanese Patent Application No. 2013-100300 filed on May 10, 2013, the disclosures of each of which are hereby incorporated herein by reference.

TECHNICAL FIELD

The present disclosure relates to a fuel injection control device applied to a fuel injection system that injects fuel, whose pressure has been raised by a high-pressure pump, through a injector, and a fuel injection system.

BACKGROUND ART

This kind of a common injector includes a fixed core that generates electromagnetic attractive force upon energization of a coil, and a movable core that is attracted to the fixed core and is displaced together with a valving element. Through control of an energization time Ti for the coil, a valve-open time of the valving element is controlled to control a fuel injection period, i.e., injection quantity Q of fuel (see Patent Document 1).

The conventional common control is premised on injection (full lift injection) being performed such that valve-closing operation is started after the valving element reaches a full lift position. For this reason, when a minutely small amount of fuel is injected, the energization time is set at the shortest energization time Ti (full lift minimum time) that enables the full lift injection, and pressure (supply fuel pressure) of fuel supplied to the injector is reduced.

However, at the time of the above-described full lift injection, in the case of injection of a minutely small amount of fuel, the supply fuel pressure needs to be decreased. Accordingly, a spray particle diameter of fuel injected through a nozzle hole becomes large due to the reduction of injection pressure. Thus, atomization of the fuel spray cannot be sufficiently promoted to cause deterioration of combustion efficiency.

On the other hand, in Patent Document 2, there is described the control whereby injection (partial injection) is performed such that the valve-closing operation is started before the valving element arrives at the full lift position by making the energization time Ti shorter than the full lift minimum time. Also through this control, a minutely small amount of fuel can be injected.

As the pressure (sack fuel pressure) of fuel in a portion (sack chamber) of a fuel passage in the injector on a downstream side of a seat part of the valving element becomes higher, the spray particle diameter of fuel injected through the nozzle hole becomes smaller so as to increase the combustion energy obtained. Therefore, it is desirable to raise the pressure (supply fuel pressure) of fuel supplied to the injector, in that the spray particle diameter can be made small.

Nevertheless, a degree of reduction of fuel through the seat part is large immediately after the valving element is opened. Consequently, the sack fuel pressure does not immediately rise despite the raise of supply fuel pressure. Hence, if the above-described partial injection is carried out, injection is ended with the sack fuel pressure remaining not sufficiently increased. Thus, fuel having a small spray particle diameter cannot be injected.

PRIOR ART DOCUMENTS

Patent Documents

Patent Document 1: JP2012-177303A
Patent Document 2: JP2013-2400A

SUMMARY OF INVENTION

The present disclosure addresses at least one of the above issues. Thus, it is an objective of the present disclosure to provide a fuel injection control device and a fuel injection system which can sufficiently promote atomization of a fuel spray even when a minutely small amount of fuel is injected.

It is another objective of the present disclosure to provide a fuel injection control device and a fuel injection system which enable injection of a minutely small amount of fuel with a spray particle diameter of fuel made small.

To achieve the objectives of the present disclosure, an aspect of the present disclosure is premised on a fuel injection control device adapted for a fuel injection system. The fuel injection system includes an injector and a high-pressure pump. The injector is configured to open a valving element and to inject fuel through a nozzle hole. The high-pressure pump is configured to raise pressure of fuel and to supply the fuel to the injector.

The present disclosure includes the following configurations. Specifically, the fuel injection control device includes a selecting means and a pump control means. The selecting means is for selecting by which one of full lift injection and partial injection to inject fuel. By the full lift injection, the valving element starts to be opened, and reaches its full lift position, and then starts to be closed. By the partial injection, the valving element starts to be opened, but does not reach its full lift position, and then starts to be closed. The pump control means is for controlling operation of the high-pressure pump such that a pressure of fuel supplied to the injector coincides with a target pressure. A maximum injection quantity of fuel when the partial injection is performed at a maximum value of the target pressure that the fuel injection system is capable of taking is referred to as a partial maximum injection quantity of fuel. The selecting means selects the partial injection when a required injection quantity of fuel is equal to or smaller than the partial maximum injection quantity.

The characteristic line (see FIG. 7) indicates the relationship between the energization time Ti and the injection quantity Q. The operation and effects of the present disclosure will be described below, with the region of the characteristic line in which the partial injection is carried out being referred to as the partial region A1, and the region of the characteristic line in which the full lift injection is carried out being referred to as the full lift region A2. The maximum injection quantity B of fuel that can be injected in the partial region A1 becomes larger as the supply fuel pressure becomes higher. Therefore, for example, when the injection quantity of fuel indicated by a reference numeral Q1 in FIG. 7 is injected at the supply fuel pressure of 10 MPa, full lift injection is carried out. When this injection quantity Q1 of fuel is injected at 20 MPa, partial injection is carried out.

Accordingly, as illustrated by the reference numeral Q1 in FIG. 7, depending on the supply fuel pressure, both the partial injection and the full lift injection may be possible. In this case, fuel is injected at higher supply fuel pressure when the partial injection is chosen than in the case of selection of the full lift injection.

According to the above-described disclosure with the view to this regard, if the required injection quantity Qreq is equal to or smaller than the partial maximum injection quantity Qplmax, the partial injection is chosen. As a result, even when a minutely small amount of fuel is injected, fuel can be injected at higher pressure than the full lift injection to sufficiently promote atomization of a fuel spray.

To achieve the objectives of the present disclosure, another aspect of the present disclosure is premised on a fuel injection control device adapted for a fuel injection system. The fuel injection system includes an injector and a high-pressure pump. The injector is configured to open a valving element and to inject fuel through a nozzle hole. The high-pressure pump is configured to raise pressure of fuel and to supply the fuel to the injector.

The present disclosure includes the following configurations. Specifically, the fuel injection control device includes a selecting means, a pump control means, and a target pressure setting means. The selecting means is for selecting by which one of full lift injection and partial injection to inject fuel. By the full lift injection, the valving element starts to be opened, and reaches its full lift position, and then starts to be closed. By the partial injection, the valving element starts to be opened, but does not reach its full lift position, and then starts to be closed. The pump control means is for controlling operation of the high-pressure pump such that a pressure of fuel supplied to the injector coincides with a target pressure. The target pressure setting means is for setting the target pressure according to an operating condition of an internal-combustion engine when the full lift injection is selected, and is for setting the target pressure at a value that is a preset lower limit pressure or higher when the partial injection is selected.

Contrary to the present disclosure, if the target pressure is set in accordance with the operating condition of the engine also at the time of partial injection, the target pressure becomes small due to the small required injection quantity so that fuel may not be injected with a small spray particle diameter. On the other hand, in the present disclosure, at the time of partial injection, the target pressure is set at a value that is a preset lower limit pressure or higher. Accordingly, at the time of partial injection, fuel is injected at a sufficiently high supply fuel pressure, so that a small spray particle diameter can be obtained even by the partial injection. Therefore, a minutely small amount of fuel can be injected with the spray particle diameter made small. Furthermore, at the time of full lift injection, the target pressure is set according to the operating condition of the engine. As a consequence, at the time of full lift injection, unnecessarily high supply fuel pressure can be avoided, and the energy required for the drive of the high-pressure pump can be prevented from becoming unnecessarily large.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of a fuel injection control device and a fuel injection system including the device will be described below with reference to the accompanying drawings.

First Embodiment

Figure 1:
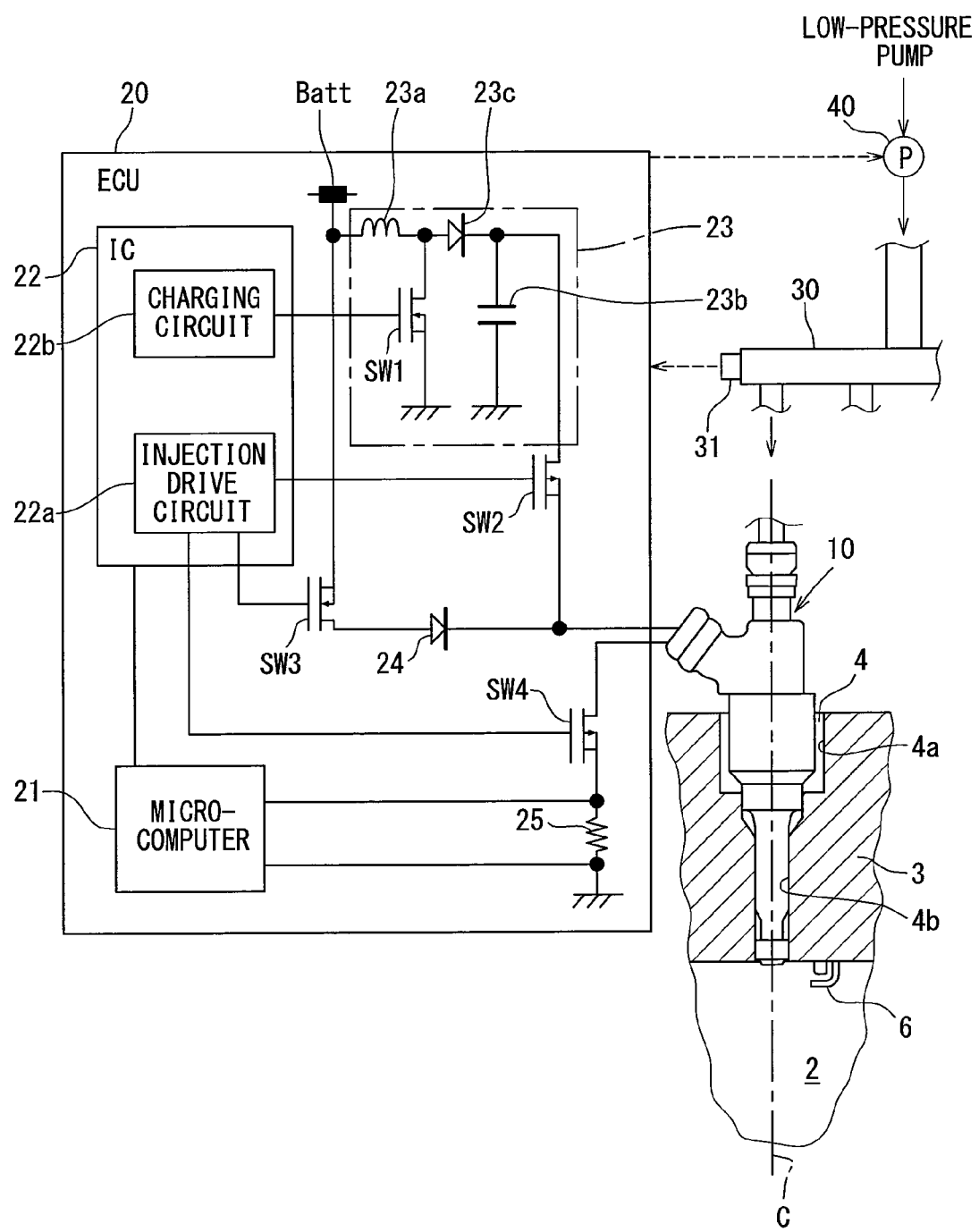
FIG. 1 is an overall view illustrating a fuel injection system in accordance with a first embodiment.

An injector 10 illustrated in FIG. 1 is disposed in an ignition-type internal combustion engine (gasoline engine) to inject fuel directly into a combustion chamber 2 of the engine. Specifically, an attachment hole 4, into which the injector 10 is inserted, is formed at a position of a cylinder head 3 defining the combustion chamber 2 that accords with an axis C of a cylinder.

The fuel supplied to the injector 10 is stored in a fuel tank (not shown). The fuel in the fuel tank is pumped up by a low-pressure pump, and is pressure-fed into a delivery pipe 30 with its pressure raised by a high-pressure pump 40. The high-pressure fuel in the delivery pipe 30 is distributed and supplied to an injector 10 of each cylinder. Structure of the high-pressure pump 40 will be described later in detail in reference to FIG. 5.

An ignition plug 6 is attached to the cylinder head 3. The ignition plug 6 and the injector 10 are arranged side by side at parts of the cylinder head 3 that are on an opposite side of the combustion chamber 2 from a piston.

Figure 2:
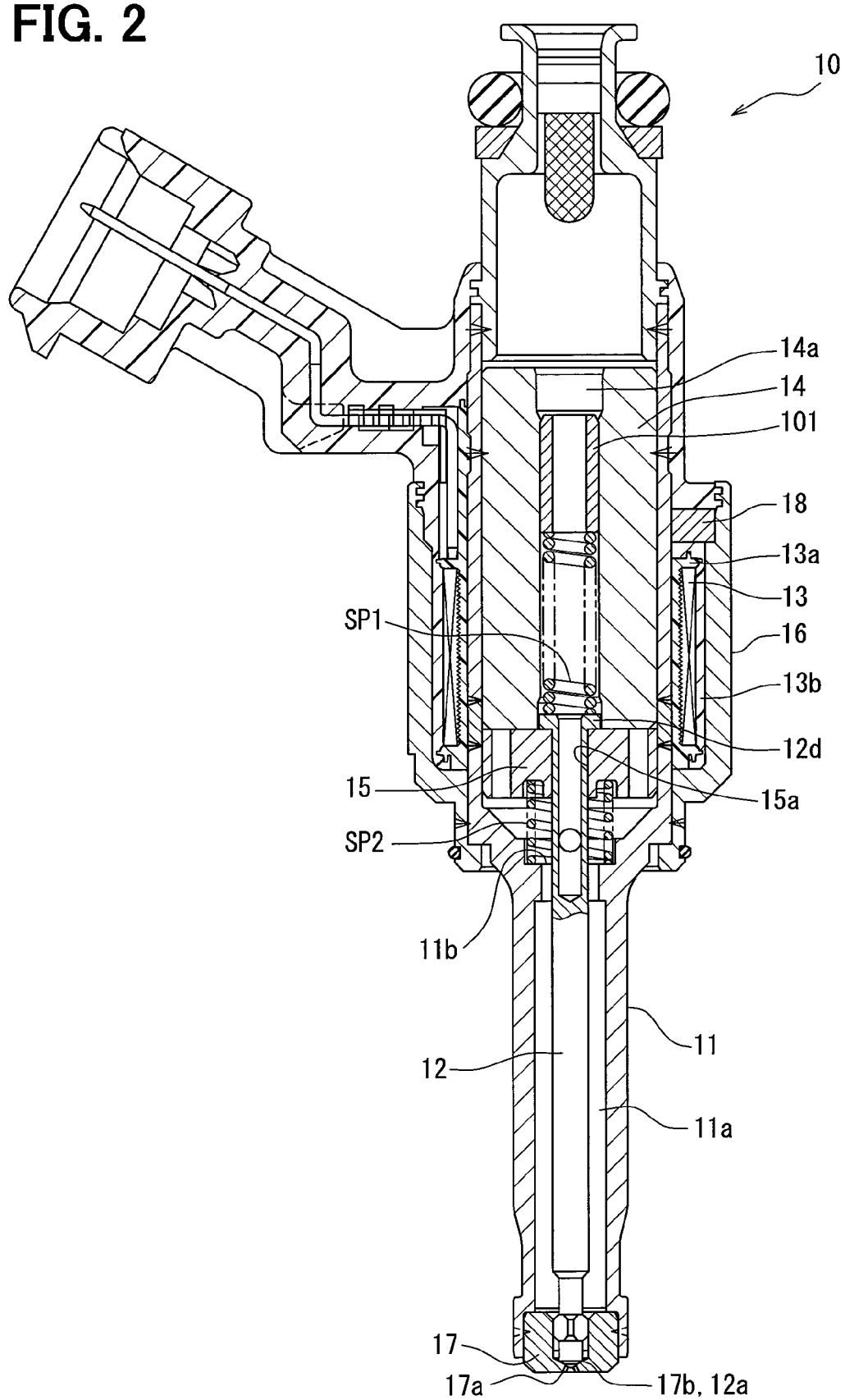
FIG. 2 is a sectional view illustrating an entire structure of an injector in FIG. 1.

As illustrated in FIG. 2, the injector 10 includes a body 11, a valving element 12, a coil 13, a fixed core 14, a movable core 15, and a housing 16. The body 11 is formed from a magnetic material to include therein a fuel passage 11a. The body 11 includes a seat surface 17b from or with which the valving element 12 is disengaged or engaged, and a nozzle hole 17a through which fuel is injected.

Figure 3:
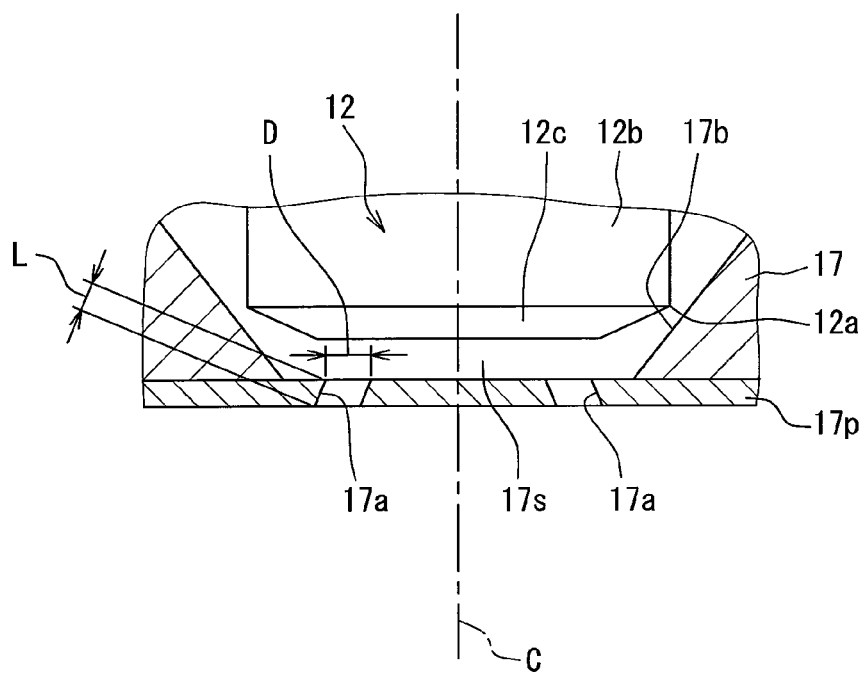
FIG. 3 is a sectional view illustrating shapes of nozzle holes, which is an enlarged view of FIG. 2.

To describe further in detail with reference to FIG. 3, a nozzle hole body 17 including the seat surface 17b is attached to the body 11. A nozzle hole plate 17p including the nozzle holes 17a is attached to the nozzle hole body 17. A part of the valving element 12 that is engaged with the seat surface 17b is a seat part 12a. Specifically, a boundary line between a main body part 12b and a distal end part 12c of the valving element 12 serves as the seat part 12a which is engaged with the seat surface 17b. The main body part 12b has a cylindrical shape extending in a direction of the axis C, and the distal end part 12c is formed in a conical shape extending from a nozzle hole-side end of the main body part 12b toward the nozzle holes 17a. In short, a corner part, which is the boundary line between the circular cylinder and the circular cone, corresponds to the annular seat part 12a extending around the axis C.

When the valving element 12 is closed to engage the seat part 12a with the seat surface 17b, fuel injection through the nozzle holes 17a is stopped. When the valving element 12 is opened (lifted up) to disengage the seat part 12a from the seat surface 17b, fuel is injected through the nozzle holes 17a. A part of the fuel passage 11a on a downstream side of the seat part 12a of the valving element 12 and on an upstream side of the nozzle holes 17a is a sack chamber 17s. As the fuel pressure in the sack chamber 17s (sack fuel pressure) becomes higher, a spray particle diameter of fuel injected from the nozzle hole 17a becomes smaller.

A flow passage length L of the nozzle hole 17a is smaller than an inlet diameter D of the nozzle hole 17a. The nozzle hole 17a is provided for the nozzle hole plate 17p such that a passage direction of the nozzle hole 17a is inclined relative to a direction perpendicular to a plate surface of the nozzle hole plate 17p. A cross-sectional shape of the nozzle hole 17a is circular. Thus, a shape of the inlet of the nozzle hole 17a is elliptical, and precisely, its inlet diameter D is a size of a major axis of an ellipse.

Back to the description of FIG. 2, the coil 13 is wound around a bobbin 13a made of resin and is sealed with this bobbin 13a and a resin material 13b. Accordingly, a coil body having a cylindrical shape is constituted of the coil 13, the bobbin 13a, and the resin material 13b.

The fixed core 14 is formed from a magnetic material into a cylindrical shape, and includes a fuel passage 14a in this cylinder. The fixed core 14 is inserted in an inner peripheral part of the body 11, and the bobbin 13a is inserted in an outer peripheral part of the body 11. Furthermore, an outer peripheral surface of the resin material 13b which seals the coil 13 is covered by the housing 16. The housing 16 is formed from a magnetic material into a cylindrical shape. A cover member 18, which is formed from a magnetic material, is attached to an open end part of the housing 16. As a result, the coil body is surrounded by the body 11, the housing 16, and the cover member 18.

The movable core 15 is formed in a disk-shaped manner from a magnetic material, and is inserted in an inner peripheral part of the body 11. The body 11, the valving element 12, the coil body, the fixed core 14, the movable core 15, and the housing 16 are arranged such that their respective central lines coincide together. The movable core 15 is disposed on the nozzle hole 17a-side of the fixed core 14, and is arranged to be opposed to the fixed core 14 such that the movable core 15 and the fixed core 14 have a predetermined gap therebetween when the coil 13 is not energized.

When the coil 13 is energized to produce electromagnetic attractive force in the fixed core 14, the movable core 15 is attracted to the fixed core 14 because of this electromagnetic attractive force. As a result, the valving element 12 which is coupled with the movable core 15 is lifted up (opened) against resilient force of a main spring SP1 and fuel pressure valve-closing force. The fuel pressure valve-closing force is a force with which the fuel pressure in the fuel passage 11a presses the valving element 12 toward its closing side. On the other hand, when the energization of the coil 13 is stopped, the valving element 12 is closed together with the movable core 15 due to the resilient force of the main spring SP1.

Figure 4:
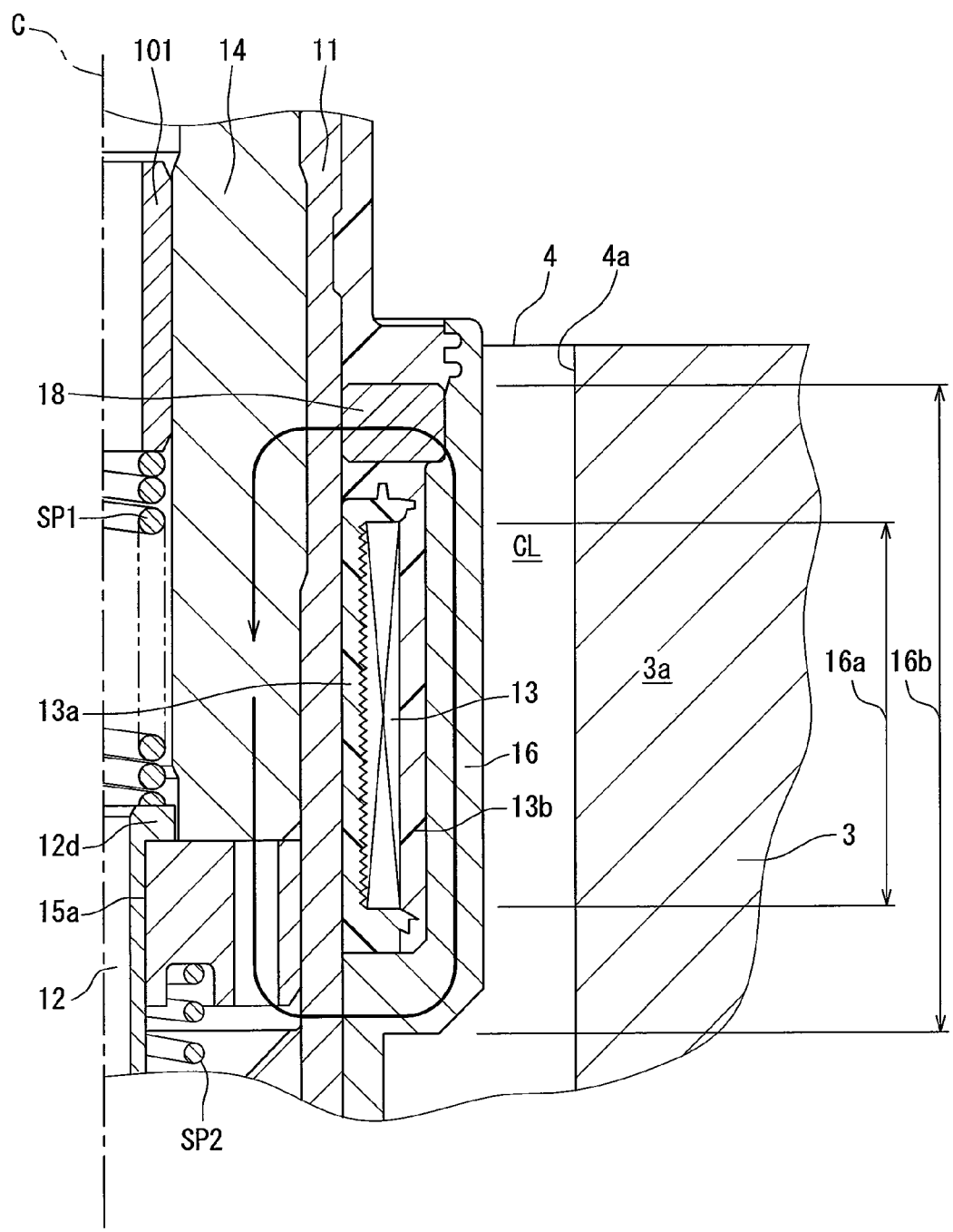
FIG. 4 is a sectional view illustrating a magnetic circuit, which is an enlarged view of FIG. 2.

FIG. 4 is an enlarged view of FIG. 2, and illustrates a state in which the injector 10 is inserted in and attached to the attachment hole 4 of the cylinder head 3. As described above, the body 11, the housing 16, the cover member 18, and the fixed core 14 which surround the coil body are formed from magnetic materials so as to constitute a magnetic circuit that serves as a passage of a magnetic flux produced upon energization of the coil 13. As indicated by an arrow in FIG. 4, the magnetic flux flows through the magnetic circuit.

A region of the housing 16 that accommodates the coil 13 is referred to as a coil region 16a. A region of the housing 16 that forms the magnetic circuit is referred to as a magnetic circuit region 16b. In other words, in an insertion direction (upper and lower directions in FIG. 4), an end surface position of the cover member 18 on an opposite side from the nozzle holes 17a (upper side in FIG. 4) is a region boundary of the magnetic circuit region 16b on the opposite side from the nozzle holes 17a. In the illustration in FIG. 4, the entire portion of the magnetic circuit region 16b in the insertion direction (upper and lower directions in FIG. 4) is surrounded with an inner peripheral surface 4a of the attachment hole 4 along its whole circumference. A part of the cylinder head 3 that surrounds the magnetic circuit along the whole circumference corresponds to "an annular conductive part 3a (predetermined position of the engine)".

An outer peripheral surface of a part of the body 11 that is located on the nozzle hole-side of the housing 16 is in contact with an inner peripheral surface 4b of the attachment hole 4 (see FIG. 1). On the other hand, a clearance CL is defined between an outer peripheral surface of the housing 16 and the inner peripheral surface 4a of the attachment hole 4 (see FIG. 4). In other words, an outer peripheral surface of the magnetic circuit region 16b and the inner peripheral surface 4a of the attachment hole 4 are opposed to each other with the clearance CL therebetween.

As described above, because the magnetic circuit is surrounded by the annular conductive part 3a, when a flux change is caused in the magnetic circuit by flowing an electric current through the coil 13 (see the arrow in FIG. 4), an eddy current is produced in the annular conductive part 3a in accordance with this flux change. This eddy current flows in a direction perpendicular to a plane of paper of FIG. 4.

Back to the description of FIG. 2, a through hole 15a is provided for the movable core 15, and the valving element 12 is inserted and arranged in this through hole 15a, so that the valving element 12 is attached to the movable core 15 to be slidable and displaceable relative to the movable core 15. An engagement part 12d is formed at an end of the valving element 12 on the opposite side from the nozzle holes 17a. When the movable core 15 is attracted and displaced to the fixed core 14, the movable core 15 moves with the engagement part 12d engaged with the movable core 15. Accordingly, at the same time as the start of the displacement of the movable core 15, the valving element 12 also starts to move (to open the nozzle holes 17a). Even in a state where the movable core 15 is in contact with the fixed core 14, the valving element 12 can be displaced relative to the movable core 15 to be lifted up.

The main spring SP1 is disposed on the opposite side of the valving element 12 from the nozzle holes 17a, and a sub-spring SP2 is arranged on the nozzle hole-side of the movable core 15. These springs SP1, SP2 are formed in a coiled shape and are resiliently deformed in the direction of the axis C. Resilient force of the main spring SP1 (main resilient force Fs1) is applied to the valving element 12 in a valve-closing direction as a reaction force from an adjustment pipe 101. Resilient force of the sub-spring SP2 (sub-resilient force Fs2) is applied to the movable core 15 in an attraction direction as a reaction force from a recessed part 11b of the body 11.

In short, the valving element 12 is clamped between the main spring SP1 and the seat surface 17b, and the movable core 15 is clamped between the sub-spring SP2 and the engagement part 12d. The sub-resilient force Fs2 is transmitted to the engagement part 12d via the movable core 15 to be applied to the valving element 12 in a valve-opening direction. Therefore, it can also be argued that resilient force Fs which is obtained by subtracting the sub-resilient force Fs2 from the main resilient force Fs1 is applied to the valving element 12 in the valve-closing direction.

Specifically, when the valving element 12 is lifted up, a compression amount (resiliently deformed amount) of the main spring SP1 is increased, so that the main resilient force Fs1 increases. On the other hand, when the valving element 12 is lifted up, a compression amount (resiliently deformed amount) of the sub-spring SP2 is reduced, so that the sub-resilient force Fs2 decreases. The resultant resilient force Fs (=Fs1+Fs2) of these forces increases in accordance with the valving element 12 being lifted up.

The main resilient force Fs1 (set load Fset1) at the time of closing the valving element 12 (stroke=0) is larger than the sub-resilient force Fs2 (set load Fset2) at the time of closing the valving element 12. Accordingly, the resultant resilient force Fs at the time of closing the valving element 12 is smaller than the set load Fset1. As illustrated in FIG. 2, the set load Fset1 of the main spring SP1 can be adjusted by regulating a position of attachment of the adjustment pipe 101 to the inside of the cylinder of the fixed core 14.

Figure 5:
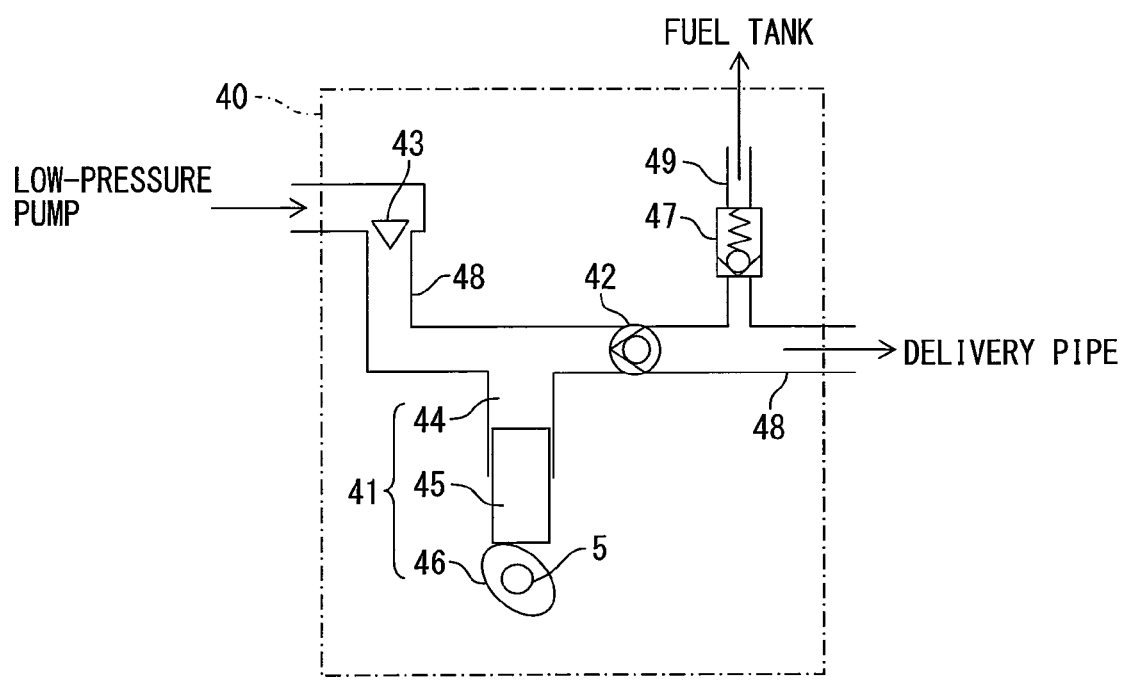
FIG. 5 is a schematic view illustrating an entire structure of a high-pressure pump in FIG. 1.

The high-pressure pump 40 will be described with reference to FIG. 5. The high-pressure pump 40 is a piston pump that suctions and discharges fuel through reciprocating movement of a plunger 45. Specifically, a drive shaft 5 of the high-pressure pump 40 is rotated by a crankshaft of the engine. Thus, the high-pressure pump 40 is a mechanical pump that is driven by rotary torque of the engine. A cam mechanism 46 converts the rotational movement of the drive shaft 5 into the reciprocating movement of the plunger 45. The plunger 45 reciprocates inside a pump chamber 44 which is disposed in a fuel passage 48. Accordingly, the fuel supplied to the high-pressure pump 40 from the low-pressure pump is drawn into the pump chamber 44, and is compressed by the plunger 45, subsequently to be discharged from the pump chamber 44 into the delivery pipe 30.

A normally-open regulation valve 43 which is closed upon energization thereof is provided on a fuel suction-side of the high-pressure pump 40. Through control of a closing period of this regulation valve 43, a fuel discharged amount of the high-pressure pump 40 is regulated. Thus, when the plunger 45 is displaced down, fuel is drawn into the pump chamber 44. Then, when the plunger 45 shifts to be displaced up, if the regulation valve 43 is not energized, regulation valve 43 maintains its open state, so that the fuel in the pump chamber 44 is returned to the upstream side. On the other hand, when the regulation valve 43 is closed upon energization of the regulation valve 43, the pressure of fuel in the pump chamber 44 rises, and this high-pressure fuel is pressure-fed into the delivery pipe 30. In this case, as closing timing (energization timing) of the regulation valve 43 is further retarded, a fuel pressure-feeding period becomes shorter and eventually a fuel pressure-fed amount becomes smaller. Instead of the normally-open type, a normally-closed valve may be employed for the regulation valve 43.

A relief valve 47 serving as a pressure release valve for restricting a fuel discharge pressure is provided on a downstream side of a check valve 42. The relief valve 47 is opened when the fuel discharge pressure of the high-pressure pump 40 is equal to or higher than a predetermined relief pressure (e.g., 25 MPa). While opened, the relief valve 47 returns the fuel, which has been discharged from the high pressure pump 40, into the fuel tank 25 through a fuel-return pipe 49. Consequently, the fuel pressure in the delivery pipe 30 does not exceed the relief pressure. The relief valve 47 may be provided for the delivery pipe 30 instead of its provision for the high-pressure pump 40.

Back to the description of FIG. 1, an electronic control unit (ECU20) may correspond to "the fuel injection control device", and includes a microcomputer 21, an integrated IC 22, a booster circuit 23, and switching elements SW2, SW3, SW4.

The microcomputer 21 includes a central processing unit, a non-volatile memory (ROM) and a volatile memory (RAM), and calculates a required injection quantity Qreq of fuel and target injection start timing based on a load of the engine and engine rotation speed. In addition, a characteristic line (see FIG. 7) indicating a relationship between the energization time Ti and the injection quantity Q are obtained beforehand through a test, and by controlling the energization time Ti for the coil 13 in accordance with this characteristic line, the injection quantity Q is controlled.

For example, a map (Ti-Q map) indicating the relationship between the energization time Ti and the injection quantity Q is prepared based on this characteristic line, and this Ti-Q map is stored in the memory. Then, the energization time Ti suited to the injection quantity that is required (required injection quantity Qreq) is set based on the Ti-Q map. As the pressure of fuel supplied to the injector 10 (i.e., fuel pressure in the delivery pipe 30) becomes higher, a shorter energization time Ti is needed. Accordingly, the Ti-Q map is prepared and stored for each supply fuel pressure, and the Ti-Q map to be consulted is switched in accordance with the supply fuel pressure at the time of injection.

The integrated IC 22 includes an injection drive circuit 22a which controls operations of the switching elements SW2, SW3, SW4, and a charging circuit 22b which controls operation of the booster circuit 23. These circuits 22a, 22b are activated based on an injection command signal outputted from the microcomputer 21. The injection command signal is a signal for commanding a state of energization of the coil 13 of the injector 10, and is set by the microcomputer 21 based on the required injection quantity Qreq and the target injection start timing, which are described above, and a coil current detection value I which will be described later. The injection command signal includes an injection signal, a boost signal, and a battery signal, which will be described later.

The booster circuit 23 includes a coil 23a, a capacitor 23b, a diode 23c, and a switching element SW1. When the charging circuit 22b controls the switching element SW1 such that the switching element SW1 repeats ON operation and OFF operation alternately, battery voltage applied by a battery terminal Batt is raised (boosted) by the coil 23a to be stored in the capacitor 23b. The voltage of electric power boosted and stored in this manner may correspond to a "boosted voltage".

When the injection drive circuit 22a turns on both the switching elements SW2, SW4, the boosted voltage is applied to the coil 13 of the injector 10. On the other hand, when the switching element SW2 is switched to be turned off and the switching element SW3 is switched to be turned on, the battery voltage is applied to the coil 13 of the injector 10. When the voltage application to the coil 13 is stopped, the switching elements SW2, SW3, SW4 are turned off. The diode 24 is for preventing the boosted voltage from being applied to the switching element SW3 when the switching element SW2 is in ON operation.

A shunt resistance 25 is for detecting an electric current flowing through the switching element SW4, i.e., an electric current flowing through the coil 13 (coil current), and based on an amount of voltage drop caused in the shunt resistance 25, the microcomputer 21 detects the above-described coil current detection value I.

The electromagnetic attractive force (valve-opening force) which is produced by flowing the coil current will be described in detail.

As magnetomotive force (ampere turn AT) generated in the fixed core 14 becomes larger, the electromagnetic attractive force becomes larger. Thus, if the number of turns of the coil 13 is the same, as the coil current is increased to make the ampere turn AT larger, the electromagnetic attractive force becomes larger. It takes time for the attractive force to be saturated to have its maximum value after starting the energization. In the present embodiment, the electromagnetic attractive force when it is saturated to reach the saturated in this manner is referred to as static attractive force Fb.

The electromagnetic attractive force necessary for the valving element 12 to start its valve-opening operation is referred to as necessary valve-opening force Fa. As the pressure of fuel supplied to the injector 10 becomes higher, the electromagnetic attractive force (valve-opening start attractive force) necessary for the valving element 12 to start the valve-opening operation becomes larger. Depending on various kinds of conditions, such as in a case of large viscosity of fuel, the valve-opening start attractive force becomes large. Accordingly, the valve-opening start attractive force on the assumption of a condition in which the valve-opening start attractive force becomes the largest is defined as the necessary valve-opening force Fa.

Figure 6:
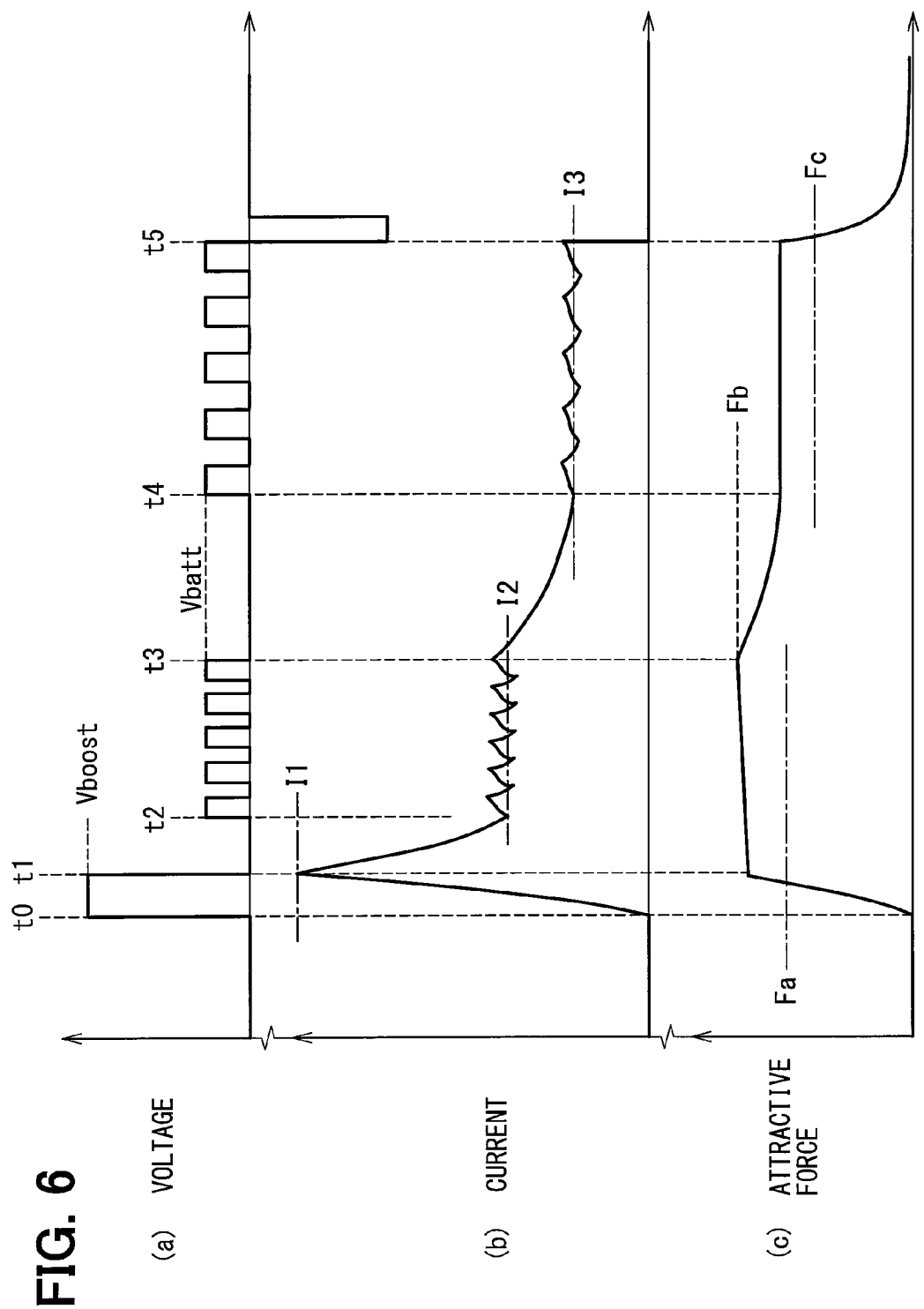
FIG. 6 is a diagram illustrating changes of voltage applied to a coil, coil current, and electromagnetic attractive force which are made over time in a case of implementation of injection control by an ECU in FIG. 1.

A graph (a) in FIG. 6 indicates a waveform of voltage applied to the coil 13 in a case of one fuel injection. As illustrated in the graph (a) in FIG. 6, at voltage application start timing t1 (i.e., start timing of the energization time Ti) commanded by the injection command signal, the boosted voltage is applied to start the energization. Accordingly, the coil current is increased to a first target value I1 as a result of the energization start (see a graph (b) in FIG. 6). At the timing t1 when the above-described coil current detection value I reaches the first target value I1, the energization is turned off. In short, the coil current is controlled to be raised to the first target value I1 by the boosted voltage application due to the first-time energization.

After that, the energization by the battery voltage is controlled such that the coil current is maintained at a second target value I2 which is set at a value that is lower than the first target value I1. Specifically, the energization is repeatedly turned on and off alternately by the battery voltage such that a difference between the coil current detection value I and the second target value I2 is within a predetermined width. Consequently, duty control is carried out such that an average value of the fluctuating coil current is maintained at the second target value I2. The second target value I2 is set at such a value that the static attractive force Fb becomes the necessary valve-opening force Fa or larger.

Then, the energization by the battery voltage is controlled such that the coil current is maintained at a third target value I3 which is set at a value that is lower than the second target value I2. Specifically, the energization is repeatedly turned on and off alternately by the battery voltage such that a difference between the coil current detection value I and the third target value I3 is within a predetermined width. Consequently, duty control is carried out such that an average value of the fluctuating coil current is maintained at the third target value I3.

As indicated in a graph (c) in FIG. 6, the electromagnetic attractive force continues to increase in a period from the energization start timing, i.e., increase control start timing (t0) to pickup control end timing (t3). An increasing speed of the electromagnetic attractive force is slower in a pickup control period than in an increase control period. The first target value I1, the second target value I2, and the pickup control period are set such that the attractive force exceeds the necessary valve-opening force Fa within the period (t0 to t3) in which the attractive force increases.

The attractive force is maintained at a predetermined value in a hold control period (t4 to t5). The third target value I3 is set such that this predetermined value is higher than valve-opening holding force Fc which is necessary to maintain a valve-open state. The valve-opening holding force Fc is smaller than the necessary valve-opening force Fa.

The injection signal included in the injection command signal is a pulse signal for commanding the energization time Ti, and pulse-ON timing is set at timing t0 that is earlier by a predetermined injection delay time than the target injection start timing. Pulse-OFF timing is set at timing t5 (i.e., end timing of the energization time Ti) at which a time in accordance with the energization time Ti has elapsed after pulse-ON. The switching element SW4 operates in accordance with this injection signal.

The boost signal included in the injection command signal is a pulse signal for commanding turning on and off of the energization by the boosted voltage, and a pulse is turned on at the same time as pulse-ON of the injection signal. After that, the boost signal is repeatedly turned on an off alternately during a period in which the coil current detection value I reaches the first target value I1. The switching element SW2 operates in accordance with this turning on and off of the boost signal. As a result, the boosted voltage is applied in the increase control period.

A pulse of the battery signal included in the injection command signal is turned on at start timing t2 for pickup control. After that, in a period until an elapsed time after the energization start reaches a predetermined time, the battery signal is repeatedly turned on and off alternately to perform feedback control, such that the coil current detection value I is maintained at the second target value I2. Further after that, in a period until the pulse of the injection signal is turned off, the battery signal is repeatedly turned on an off alternately to perform the feedback control such that the coil current detection value I is maintained at the third target value I3. The switching element SW3 operates in accordance with this battery signal.

The pressure of fuel supplied to the injector 10 is detected by a fuel pressure sensor 31 (see FIG. 1) which is attached to the delivery pipe 30. Based on the supply fuel pressure detected by the fuel pressure sensor 31, the ECU 20 determines whether the above-described pickup control is performed. For example, if the supply fuel pressure is a predetermined value or higher, the pickup control is permitted, whereas if the supply fuel pressure is smaller than the predetermined value, the pickup control is not carried out, and hold control is performed after increase control.

Figure 7:
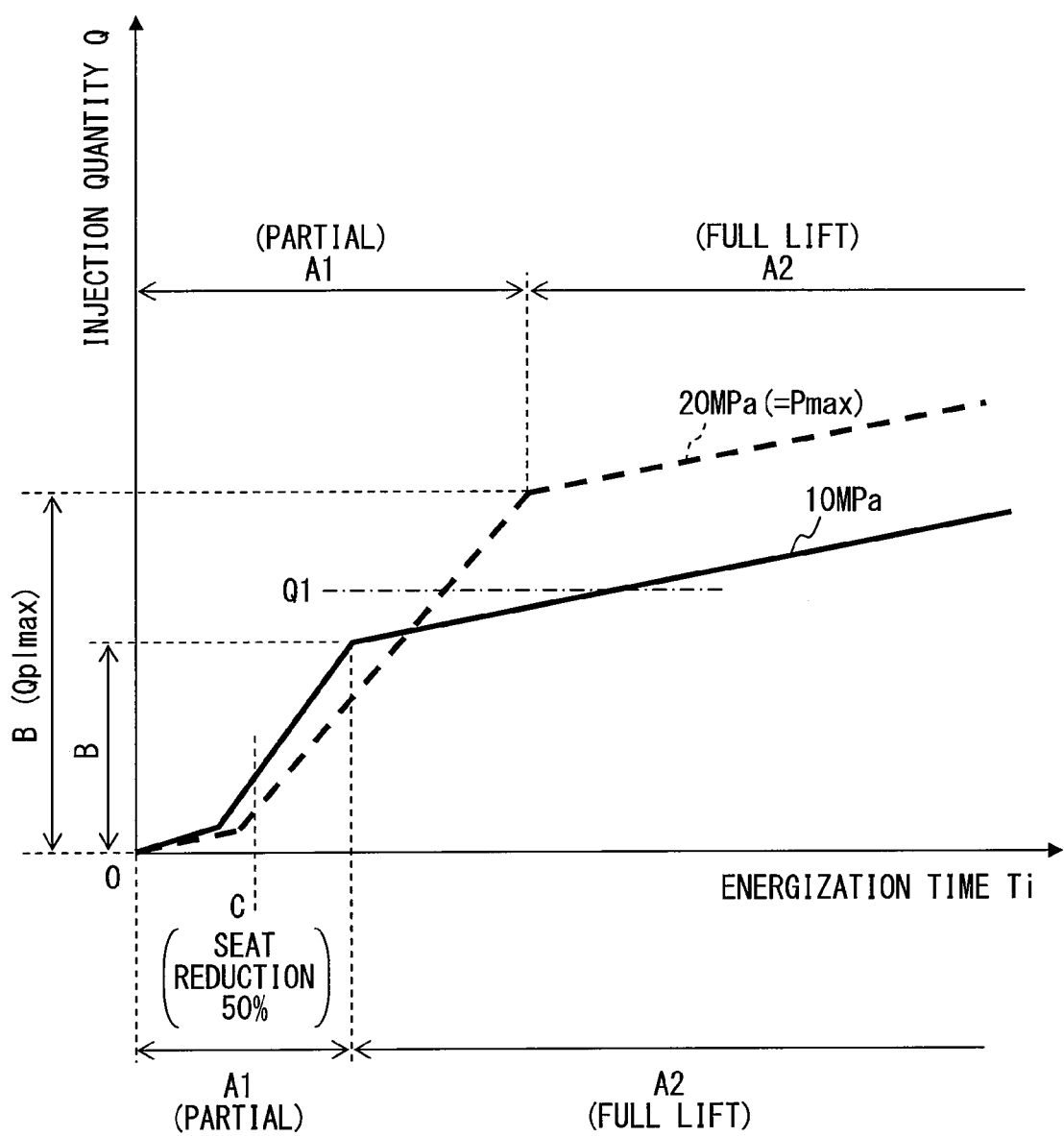
FIG. 7 is a diagram illustrating Ti-Q characteristics of the injector in FIG. 2.

FIG. 7 illustrates the characteristic lines indicating the relationship between the energization time Ti and the injection quantity Q. In FIG. 7, a continuous line is a characteristic line when the supply fuel pressure is 10 MPa, and a dashed line is a characteristic line when the supply fuel pressure is 20 MPa. In the present embodiment, the maximum value of target pressure that the fuel injection system can take (system maximum fuel pressure Pmax) is 10 MPa. The system maximum fuel pressure Pmax is set at a value that is lower than the maximum discharge pressure of the high-pressure pump 40, and is set at the maximum value at which the fuel pressure (supply fuel pressure) in the delivery pipe 30 can be stably maintained.

A region of the characteristic line indicated by a reference numeral A1 is referred to as a partial region, and a region of the characteristic line indicated by a reference numeral A2 is referred to as a full lift region. When fuel is injected (partial injection) with the energization time Ti in the partial region A1, valve-closing operation is started before the movable core 15 collides with the fixed core 14, i.e., before the valving element 12 reaches a full lift position, and a minutely small amount of fuel is injected. The full lift position is a lift position of the valving element 12 at the time that the movable core 15 collides with the fixed core 14. On the other hand, when fuel is injected (full lift injection) with the energization time Ti in the full lift region A2, the valve-closing operation is started after the valving element 12 reaches the full lift position. Accordingly, the injection quantity is larger than the case of injection in the partial region A1.

The maximum injection quantity B of fuel that can be injected in the partial region A1 becomes larger as the supply fuel pressure becomes higher. Therefore, for example, when an injection quantity of fuel indicated by a reference numeral Q1 in FIG. 7 is injected at the supply fuel pressure of 10 MPa, fuel should be injected in the full lift region A2. When this injection quantity Q1 of fuel is injected at 20 MPa, fuel should be injected in the partial region A1.

A proportion of a seat reduction degree to a total value of a pressure loss (seat reduction degree) due to a flow reduction at the seat part 12a of the valving element 12, and a pressure loss due to flow reduction through the nozzle hole 17a (nozzle hole reduction degree) is referred to as a seat reduction rate. Immediately after the injection start, the seat reduction degree is larger than the nozzle hole reduction degree, and the seat reduction rate becomes smaller as the valving element 12 is further lifted up. In addition, a reference symbol C in FIG. 7 indicates the energization time Ti when the seat reduction rate is 50% on the characteristic line when the supply fuel pressure is 10 MPa.

Processing procedures for various kinds of control performed by the microcomputer 21 will be described with reference to FIGS. 8, 9 and 10. These controls are carried out repeatedly with a predetermined period (e.g., operation period of the CPU) during an operating period of the engine.

First, the procedure by which the injector 10 is controlled will be described with reference to FIG. 8. At S10 (selecting means) in FIG. 8, it is determined whether the above-described required injection quantity Qreq is equal to or smaller than the partial maximum injection quantity Qplmax at the system maximum fuel pressure Pmax. The determination that Qreq Qplmax means that fuel can be injected in the partial region A1 if the supply fuel pressure is set at the system maximum fuel pressure Pmax. In this case of affirmative determination, at the subsequent S11 (selecting means), the small-large comparison between "an output improved amount" and "a pump loss amount" which will be described below is made.

For example, in the case where the injection is possible both in the partial region A1 and in the full lift region A2 like the injection of the minutely small amount of fuel indicated by the reference numeral Q1 in FIG. 7, when the injection in the partial region A1 is selected with the supply fuel pressure set at the system maximum fuel pressure Pmax, fuel is injected at higher pressure than the injection in the full lift region A2. Accordingly, the spray particle diameter becomes small. As a result, output torque of the engine relative to the fuel injection quantity, i.e., output efficiency of the engine, is improved. The torque required for the drive of the high-pressure pump 40 is excluded from the output torque in this case.

However, as a trade-off for this, when the partial injection is selected and the supply fuel pressure is set at the system maximum fuel pressure Pmax, the rotation load of the drive shaft 5 increases in accordance with the increase of the amount of fuel discharged from the high-pressure pump 40. The above-described output torque (output efficiency) relative to the fuel injection quantity is thereby reduced.

In this manner, the amount of improvement in output efficiency of the engine due to the reduction of the spray particle diameter by the selection of the partial injection compared with the case of selection of the full lift injection is referred to as "the output improved amount". Also, the amount of reduction in output efficiency of the engine due to the increase of the load of the high-pressure pump 40 by the selection of the partial injection compared with the case of selection of the full lift injection is referred to as "the pump loss amount".

These pump loss amount and output improved amount are different according to an operating condition of the engine at that time. For example, a load, rotation speed, temperature of the engine, or a load when the engine drives an auxiliary machine can be taken for a concrete example of this operating condition. Thus, at S11, the small-large comparison between the output improved amount and the pump loss amount is made according to these operating conditions.

If it is determined at S11 that: output improved amount>pump loss amount, at the following S12, S13, the operation of the injector 10 is controlled such that the supply fuel pressure is set at the system maximum fuel pressure Pmax and the required injection quantity Qreq of fuel is injected in the partial region A1.

Specifically, at S12 (injection command period setting means), the energization time Ti corresponding to the required injection quantity Qreq is set by reference to the Ti-Q map prepared based on the characteristic line corresponding to Pmax. Then, the injection command signal including the energization time Ti (injection signal) which is set in this manner is outputted to the integrated IC 22. Accordingly, the injector 10 injects the required injection quantity Qreq of fuel in the partial region A1 on the characteristic line corresponding to Pmax. At the next S13, a forcible command flag is set at ON such that a target supply fuel pressure Ptrg (target pressure) which will be described later becomes the system maximum fuel pressure Pmax.

If it is determined at S10 that: Qreq>Qplmax (S10: YES), the partial maximum injection quantity Qplmax is insufficient for the required injection quantity Qreq. Consequently, in this case, at S14 (injection command period setting means), the operation of the injector 10 is controlled such that the required injection quantity Qreq of fuel is injected in the full lift region A2.

If it is determined at S11 that: output improved amount 5 pump loss amount (S10: NO), the above-described insufficiency is not produced. Hence, although the injection in the partial region A1 is possible, a disadvantage (pump loss amount) due to the injection in the partial region A1 is greater than an advantage (output improved amount). For this reason, in this case as well, at S14, the operation of the injector 10 is controlled such that the required injection quantity Qreq of fuel is injected in the full lift region A2. After performing the processing at S14, the forcible command flag is set at OFF at the following S15.

The procedure for controlling the high-pressure pump 40 will be described with reference to FIG. 9. First, at S20 in FIG. 9, it is determined whether the forcible command flag is set at ON in the processing in FIG. 8. If the forcible command flag is set at ON (S20: YES), at the subsequent S21 (target pressure setting means), the target supply fuel pressure Ptrg is set at the system maximum fuel pressure Pmax. If the forcible command flag is set at OFF (S20: NO), at the next S 22 (target pressure setting means), the target supply fuel pressure Ptrg is set based on the load of the engine and engine rotation speed using a fuel pressure map which will be described later.

Specifically, a relationship between the target injection quantity Qreq and the engine rotation speed corresponding to the load, and an optimum value of the supply fuel pressure is obtained beforehand through a test. The fuel pressure map indicating this relationship is stored in the memory. This fuel pressure map is prepared based on a test result in the case of the injection in the full lift region A2. Then, based on the target injection quantity Qreq and the engine rotation speed, the target supply fuel pressure Ptrg is set by reference to the fuel pressure map.

At the following S23 (pump control means), feedback control is performed on the high-pressure pump 40 such that an actual fuel pressure Pact detected by the fuel pressure sensor 31 coincides with the target supply fuel pressure Ptrg which is set at S21, S22. Specifically, based on a difference between the target supply fuel pressure Ptrg and the actual fuel pressure Pact, the operation of the regulation valve 43 is controlled to perform the feedback control on the amount of fuel pressure-fed by the plunger 45.

The procedure for updating and learning the fuel pressure map will be described with reference to FIG. 10. First, at S30 (detecting means) in FIG. 10, a waveform of electric current flowing through the coil 13 at the time of energization of the coil 13 (see the graph (b) in FIG. 6) or a waveform of voltage applied to the coil 13 is obtained. At the subsequent S31 (detecting means), valve-closing timing at which the valving element 12 is engaged with the seat surface 17b to end the injection is estimated based on the waveform obtained at S30. For example, a characteristic pulsation in the waveform appears due to the engagement. Thus, the valve-closing timing is estimated based on this pulsation appearance timing.

At the next S32 (injection data obtaining means), the actual injection quantity is estimated based on the valve-closing timing which is estimated at S31. Specifically, injection start timing (valve-opening timing) is estimated first based on the timing at which the start of energization of the coil 13 is commanded by the injection command signal. For example, timing at which a predetermined delay time is added to the command timing for the energization start may be estimated as the valve-opening timing. Then, an injection period is calculated based on the valve-opening timing and the valve-closing timing which have been estimated. Next, the actual injection quantity is calculated based on the supply fuel pressure at the time of this injection and the calculated injection period.

Figure 8:
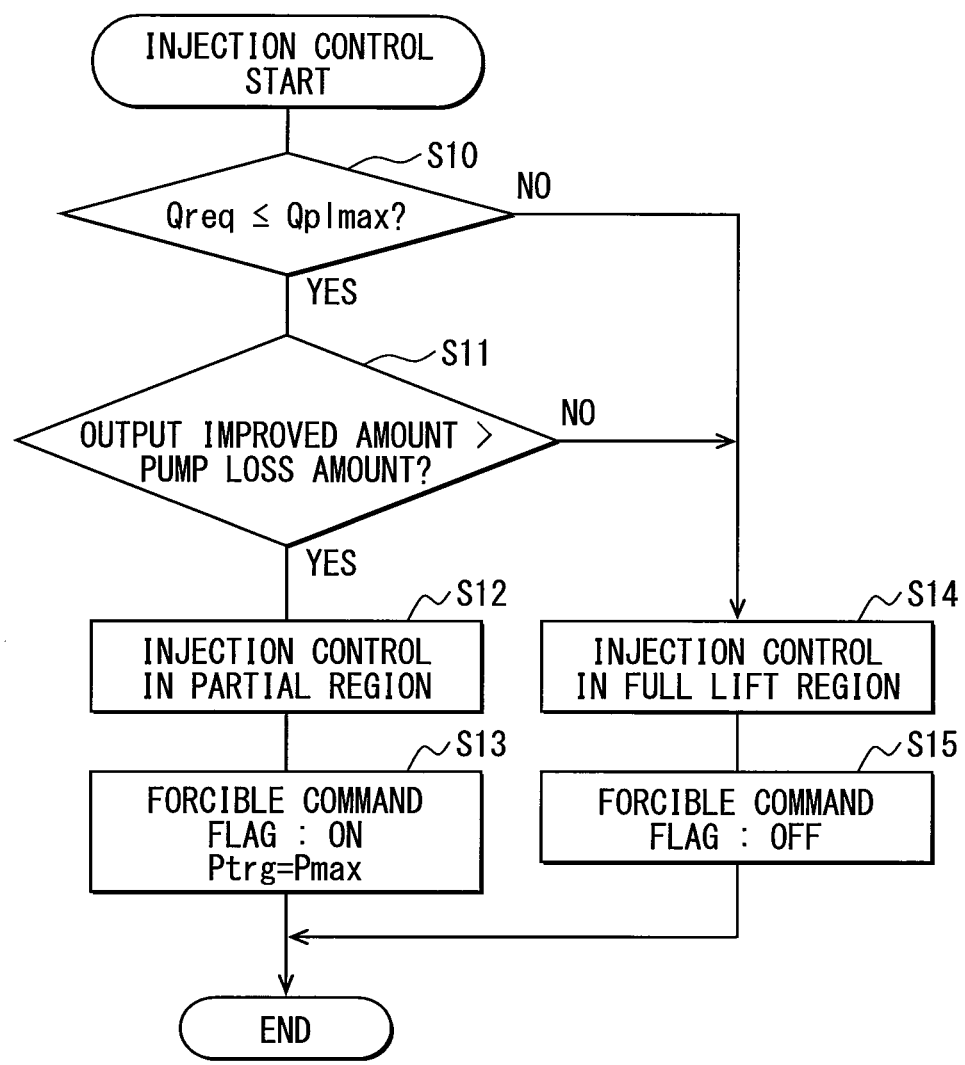
FIG. 8 is a flow chart illustrating a processing procedure of injection control by a microcomputer in FIG. 1.

At the following S33 (injection data obtaining means), based on the actual injection quantity estimated at S32 and the energization time Ti at the time of this injection, the injection quantity Q stored in the Ti-Q map which is used in the control in FIG. 8 is updated and rewritten. Accordingly, the value in the Ti-Q map is learned based on the actual injection quantity. The Ti-Q map learned in this manner corresponds to injection data indicating a relationship between a valve-opening command period and the actual injection quantity.

In essence, the present embodiment described above has characteristics enumerated below. The following operation and effects are produced by these characteristics.

A first characteristic will be described below. In the present embodiment, it is determined at S10 in FIG. 8 whether the required injection quantity Qreq is equal to or smaller than the partial maximum injection quantity Qplmax, and the partial injection is chosen under condition of Qreq≤Qplmax. Accordingly, as indicated by the reference numeral Q1 in FIG. 7, if both of the partial injection and the full lift injection are possible, depending on the supply fuel pressure, the partial injection is chosen. Thus, even when a minutely small amount of fuel is injected, fuel can be injected at higher pressure than the full lift injection to sufficiently promote atomization of a fuel spray.

A second characteristic will be described below. Contrary to the present embodiment, if the target pressure Ptrg is set in accordance with the operating condition of the engine also at the time of partial injection, the target pressure becomes small due to the small required injection quantity so that fuel may not be injected with a small spray particle diameter. On the other hand, in the present embodiment, at the time of partial injection, the target pressure Ptrg is set at the system maximum fuel pressure Pmax (value that is a preset lower limit pressure or higher). Accordingly, at the time of partial injection, fuel is injected at a sufficiently high supply fuel pressure, so that a small spray particle diameter can be obtained even by the partial injection. Therefore, a minutely small amount of fuel can be injected with the spray particle diameter made small.

At the time of full lift injection, the target pressure Ptrg is set according to the operating condition of the engine. Consequently, at the time of full lift injection, unnecessarily high supply fuel pressure can be avoided, and the energy required for the drive of the high-pressure pump 40, i.e., the load of the engine for rotating the drive shaft 5 can be prevented from becoming unnecessarily large.

A third characteristic will be described below. The ECU 20 sets the target pressure Ptrg at the time of partial injection at the system maximum fuel pressure Pmax. Accordingly, a large spray particle diameter at the time of partial injection can be maximally limited. As a result, combustion energy obtained per unit of injection quantity can be increased.

A fourth characteristic will be described below. The ECU 20 makes a comparison between the output improved amount due to the reduction of the spray particle diameter by the selection of the partial injection, and the pump loss amount due to the increase of the load of the high-pressure pump 40 by the selection of the partial injection. Then, the partial injection is chosen under condition of: output improved amount>pump loss amount (S11: YES). Accordingly, a situation such as a decrease of output of the engine obtained for the injection quantity despite the reduced spray particle diameter by the partial injection can be avoided.

A fifth characteristic will be described below. The ECU 20 includes the detecting means S30, S31, the injection data obtaining means S32, S33, and the injection command period setting means S12, S14. The detecting means S30, S31 detects the valve-closing timing for the valving element 12. Based on the valve-closing timing detected at the time of partial injection, the injection data obtaining means S32, S33 calculates the actual injection quantity by the partial injection. The injection data obtaining means S32, S33 obtains the injection data indicating a relationship between the valve-opening command period for the valving element 12 and the actual injection quantity. The injection command period setting means S12, S14 sets a period in which to command the injector 10 to open the valving element 12 (injection command signal) based on the required injection quantity and the injection data.

In this manner, when the valve-closing timing is detected to calculate the actual injection quantity, accuracy in calculation of the actual injection quantity is reduced if the sack fuel pressure is low. For that reason, if the injection command signal is set based on the injection data using this calculating result, there is a concern about deterioration of injection accuracy. On the other hand, in the present embodiment, at the time of partial injection, the target pressure is set at the value that is the lower limit pressure or higher. As a result, the sack fuel pressure at the time of partial injection becomes large. Thus, deterioration of the accuracy in calculation of the actual injection quantity can be limited, and the injection accuracy deterioration can be limited.

A sixth characteristic will be described below. Contrary to the present embodiment, the valving element is opened swiftly in a case of an injector configured such that after the movable core is displaced by a predetermined amount, the valving element is engaged with the movable core to start the valve-opening operation. Thus, an initial speed of the valving element which opens a nozzle hole is fast. For this reason, because an increasing speed of sack fuel pressure becomes fast, the issue that "at the time of partial injection, injection is ended with the sack fuel pressure remaining not sufficiently increased, so that fuel having a small spray particle diameter cannot be injected" does not markedly arise.

On the other hand, the injector 10 of the present embodiment is configured such that at the same time as the start of displacement of the movable core 15, the valving element 12 also starts to move (valve-opening operation). Accordingly, there is markedly produced the effect of "making small the spray particle diameter" by such a configuration that "the partial injection is chosen if the required injection quantity Qreq is equal to or smaller than the partial maximum injection quantity Qplmax".

A seventh characteristic will be described below. In relation to the shape of the nozzle hole 17a, there are the following two kinds of design concepts to promote the atomization of the fuel spray. One of the concepts is an in-nozzle hole shearing concept that by making long the flow passage length L of the nozzle hole 17a, tearing of fuel due to shearing force of fuel and air in the nozzle hole 17a is promoted to achieve the atomization of the fuel spray. The other one of the concepts is an out-of-nozzle hole shearing concept that by making short the flow passage length L of the nozzle hole 17a, pressure loss in the nozzle hole 17a is reduced, and tearing of fuel due to shearing force of fuel and air immediately after the injection through the nozzle hole 17a is promoted to achieve the atomization of the fuel spray. In the present embodiment, as illustrated in FIG. 3, setting is L<D, and therefore there is employed a structure by the out-of-nozzle hole shearing concept.

Contrary to the present embodiment, in a case of a structure by the in-nozzle hole shearing concept (L>D), a degree of contribution of the sack fuel pressure to the atomization of the fuel spray is smaller than the case of the out-of-nozzle hole shearing concept. Thus, the issue that "at the time of partial injection, injection is ended with the sack fuel pressure remaining not sufficiently increased, so that fuel having a small spray particle diameter cannot be injected" does not markedly arise.

On the other hand, the injector 10 of the present embodiment employs a structure by the out-of-nozzle hole shearing concept (L<D). Accordingly, there is markedly produced the effect of "making small the spray particle diameter" by such a configuration that "the partial injection is chosen if the required injection quantity Qreq is equal to or smaller than the partial maximum injection quantity Qplmax".

The injector 10 in the present embodiment employs the structure by the out-of-nozzle hole shearing concept (L<D). Consequently, there is markedly produced the effect of "making small the spray particle diameter" by such a configuration that "at the time of partial injection, the target pressure is set at the value that is the lower limit pressure or higher".

An eighth characteristic will be described below. In the injector 10 of the present embodiment, an outer peripheral surface of at least a part of the coil region 16a of the housing 16 is surrounded by the inner peripheral surface 4a of the attachment hole 4 along its whole circumference. Because the cylinder head 3 which constitutes the combustion chamber 2 has high temperature, the temperature of the coil 13 easily becomes high if the coil region 16a is surrounded with the attachment hole 4. Accordingly, electric resistance of the coil 13 becomes large, so that a value of electric current flowing through the coil 13 becomes low upon start of the energization, thereby slowing an increasing speed of magnetic attractive force. Thus, the increasing speed of attractive force from t0 to t1 in the graph (c) in FIG. 6 becomes slow. As a result, a period in which the sack fuel pressure immediately after the valving element 12 is opened is low becomes long, so that a demand on the atomization of the fuel spray during this period is increased.

Therefore, as in the present embodiment, by employing such a configuration that "the partial injection is chosen if the required injection quantity Qreq is equal to or smaller than the partial maximum injection quantity Qplmax" for the injector 10 in which the coil region 16a is surrounded by the inner peripheral surface 4a along the whole circumference, there is markedly produced the effect of "making small the spray particle diameter".

As in the present embodiment, by employing such a configuration that "at the time of partial injection, the target pressure is set at the value that is the lower limit pressure or higher" for the injector 10 in which the coil region 16a is surrounded by the inner peripheral surface 4a along the whole circumference, there is markedly produced the effect of "making small the spray particle diameter".

A ninth characteristic will be described below. The injector 10 is disposed at a position at which to inject fuel directly into the combustion chamber 2 so as to be located near the ignition plug 6. For this reason, it is important to make the spray particle diameter small to reduce the attachment of fuel injected from the injector 10 to the ignition plug 6. Accordingly, as in the present embodiment, by employing such a configuration that "the partial injection is chosen if the required injection quantity Qreq is equal to or smaller than the partial maximum injection quantity Qplmax" for the injector 10 with a direct-injection arrangement, there is markedly produced the effect of "making small the spray particle diameter".

A tenth characteristic will be described below. In controlling the high-pressure pump 40 such that the supply fuel pressure reaches the target pressure Ptrg, at the time of partial injection, the target pressure Ptrg is set at the system maximum fuel pressure Pmax (value that is a preset lower limit pressure or higher). Accordingly, at the time of partial injection, fuel is injected at a sufficiently high supply fuel pressure to achieve a small spray particle diameter. Therefore, a minutely small amount of fuel can be injected with the spray particle diameter made small.

On the other hand, at the time of full lift injection, the target pressure Ptrg is set according to the operating condition of the engine. Consequently, at the time of full lift injection, unnecessarily high supply fuel pressure can be avoided, and the energy required for the drive of the high-pressure pump 40, i.e., the load of the engine for rotating the drive shaft 5 can be prevented from becoming unnecessarily large.

An eleventh characteristic will be described below. Contrary to the present embodiment, the valving element is opened swiftly in a case of an injector configured such that after the movable core is displaced by a predetermined amount, the valving element is engaged with the movable core to start the valve-opening operation. Thus, an initial speed of the valving element which opens a nozzle hole is fast. For this reason, because an increasing speed of sack fuel pressure becomes fast, the issue that "at the time of partial injection, injection is ended with the sack fuel pressure remaining not sufficiently increased, so that fuel having a small spray particle diameter cannot be injected" does not markedly arise.

On the other hand, the injector 10 of the present embodiment is configured such that at the same time as the start of displacement of the movable core 15, the valving element 12 also starts to move (valve-opening operation). Consequently, there is markedly produced the effect of "making small the spray particle diameter" by such a configuration that "at the time of partial injection, the target pressure is set at the value that is the lower limit pressure or higher".

A twelfth characteristic will be described below. The injector 10 is disposed at a position at which to inject fuel directly into the combustion chamber 2 so as to be located near the ignition plug 6. For this reason, it is important to make the spray particle diameter small to reduce the attachment of fuel injected from the injector 10 to the ignition plug 6. Accordingly, as in the present embodiment, by employing such a configuration that "at the time of partial injection, the target pressure is set at the value that is the lower limit pressure or higher" for the injector 10 with a direct-injection arrangement, there is markedly produced the effect of "making small the spray particle diameter".

Second Embodiment

In the above first embodiment, at S11 in FIG. 8, the output improved amount and the pump loss amount are calculated, and it is determined whether the inequation: output improved amount>pump loss amount is satisfied based on this calculation result. In the present embodiment, at the time of starting of the engine, the output improved amount and the pump loss amount are not calculated, and the full lift injection is chosen with the output improved amount considered to be smaller than the pump loss amount.

The "time of starting" in this case means the time while the engine is driven by a starter motor. At such starting time, it is highly probable that the output improved amount is larger than the pump loss amount. Accordingly, in the present embodiment, a processing load of a microcomputer 21 which calculates the output improved amount and the pump loss amount is reduced, and the control which performs the full lift injection in the case of output improved amount<pump loss amount, can be realized.

Third Embodiment

In the above first embodiment, at S10 in FIG. 8, a small-large comparison is made between the partial maximum injection quantity Qplmax and the required injection quantity Qreq, and based on this comparison result, it is determined whether the partial injection is carried out. In the present embodiment, when the engine is in idle operation, the small-large comparison between Qplmax and Qreq is not made, and the partial injection is chosen with the required injection quantity Qreq considered to be equal to or smaller than the partial maximum injection quantity Qplmax.

At such time of idle operation, it is highly probable that the required injection quantity Qreq is equal to or smaller than the partial maximum injection quantity Qplmax. For this reason, in the present embodiment, a processing load of a microcomputer 21 which makes the small-large comparison between Qplmax and Qreq can be reduced, and control can be performed to carry out the partial injection in the case of Qreq≤Qplmax.

Fourth Embodiment

Figure 13:
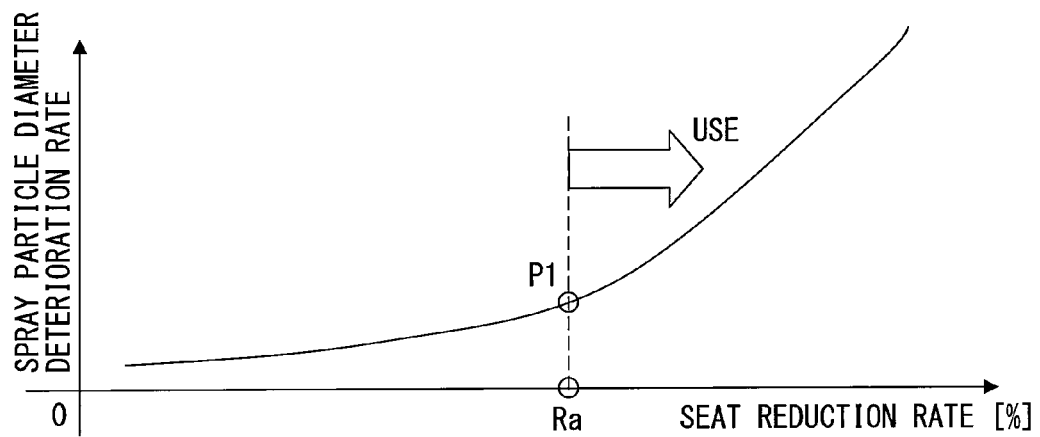
FIG. 13 is a test result illustrating a relationship between the spray particle diameter deterioration rate and a seat reduction rate in accordance with a fourth embodiment.

FIG. 13 is a numerical analysis result indicating a relationship between the seat reduction rate and the spray particle diameter. The vertical axis of FIG. 13 indicates the spray particle diameter deterioration rate in the case of full lift injection, and the horizontal axis of FIG. 13 indicates the seat reduction rate when the valving element 12 is fully lifted. The analysis result in FIG. 13 indicates that the spray particle diameter deterioration rate becomes larger as the seat reduction rate becomes larger.

However, although a slope of a characteristic line indicated in FIG. 13 increases as the seat reduction rate becomes larger, the slope of the line does not increase in proportion to the seat reduction rate but increases exponentially with respect to the increase of the seat reduction rate. A point at which this increasing speed reaches the maximal value is a changing point indicated by a reference numeral P1 in FIG. 13. More specifically, a point at which the second order differential value of the characteristic line indicated in FIG. 13 is maximized is the changing point P1, and can be said to be a point where the increasing speed of the slope of the characteristic line is the fastest and the spray particle diameter deterioration rate changes to rapidly become large.

In the present embodiment with the view to this regard, such a configuration that "the partial injection is chosen if the required injection quantity Qreq is equal to or smaller than the partial maximum injection quantity Qplmax" is applied to an injector 10 configured to have the seat reduction rate that is equal to or higher than a seat reduction rate Ra (e.g., 30%) of the changing point P1. Accordingly, the effect of atomizing the fuel spray is markedly produced.

In the present embodiment with the view to this regard, such a configuration that the target fuel pressure Ptrg is set at the lower limit pressure or higher at the time of partial injection is applied to the injector 10 configured to have the seat reduction rate that is equal to or higher than the seat reduction rate Ra (e.g., 30%) of the changing point P1. Consequently, the effect of atomizing the fuel spray is markedly produced.

The present disclosure is not limited to the descriptions of the above embodiments, and may be embodied through the following modifications. Furthermore, characteristic configurations of the embodiments may be respectively combined arbitrarily.

The selecting means of the present disclosure is not limited to the methods at S10, S11 in FIG. 8. For example, the determination processing at S11 in FIG. 8 may be eliminated. Moreover, S13, S15 in FIG. 8 and S20, S21 in FIG. 9 may be eliminated. At the time of partial injection as well, the target supply fuel pressure Ptrg may be set similar to the time of full lift injection.

The selecting means of the present disclosure is not limited to the methods at S10, S11 in FIG. 8. For example, the determination processing at S10 or S11 in a flow chart in FIG. 8 may be eliminated. Furthermore, at S10, the required injection quantity Qreq is small-large compared to the partial maximum injection quantity Qplmax. Alternatively, the required injection quantity Qreq may be small-large compared with a determination value that is set at a value different from the partial maximum injection quantity Qplmax.

In a case of implementation of divided injection whereby fuel is injected with the required injection quantity Qreq divided among multiple times during one combustion cycle, it is highly probable that one required injection quantity Qreq is the partial maximum injection quantity Qplmax or smaller. Accordingly, when the divided injection is required, the processing at S10 in FIG. 8 where a small-large comparison is made between Qplmax and Qreq is not carried out, and the partial injection may be chosen with the inequation: Qreq≤Qplmax (S10: YES) considered to be satisfied.

Figure 9:
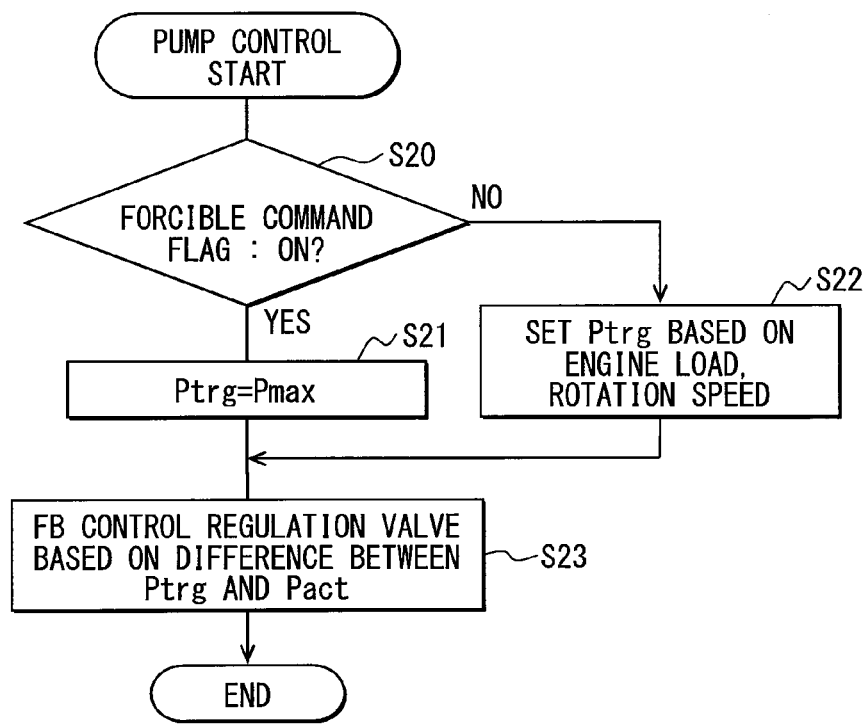
FIG. 9 is a flow chart illustrating a processing procedure of pump control by the microcomputer in FIG. 1.
Figure 10:
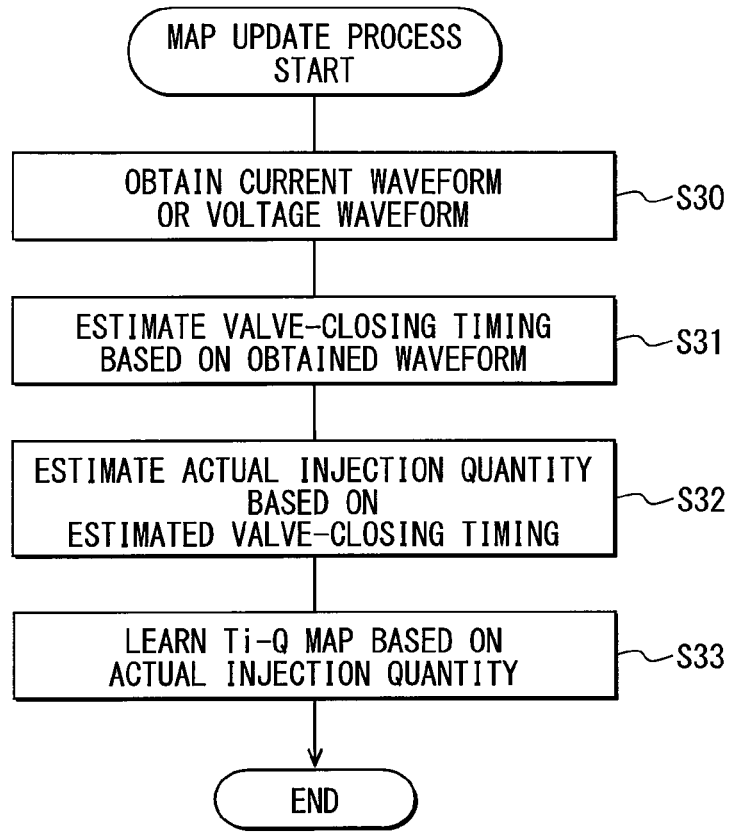
FIG. 10 is a flow chart illustrating a procedure for a map update process by the microcomputer in FIG. 1.

In the pump control in FIG. 9, the operation of the regulation valve 43 is feedback controlled based on the difference between the target supply fuel pressure Ptrg and the actual fuel pressure Pact. However, the pump control means of the present disclosure is not limited to the feedback control. For example, the operation of the regulation valve 43 for the target supply fuel pressure Ptrg may be set beforehand, and the operation of the regulation valve 43 may be controlled in accordance with this setting.

In the above first embodiment, based on the out-of-nozzle hole shearing concept, the flow passage length L of the nozzle hole 17a is made shorter than the inlet diameter D of the nozzle hole 17a. When the shape of the inlet of the nozzle hole 17a is an ellipse, in the above first embodiment, a size of a major axis of the ellipse is used for the inlet diameter D. Alternatively, a size of a minor axis may be employed. Moreover, the flow passage length L may be made smaller than a size of diameter of a cross section of the flow passage of the nozzle hole 17a.

The injector 10 of the above first embodiment is configured such that at the same time as the start of displacement of the movable core 15, the valving element 12 also starts to move (valve-opening operation). Alternatively, the injector 10 may be configured such that even when the displacement of the movable core 15 is started, the valving element 12 does not start to be opened and at the time when the movable core 15 is displaced by a predetermined amount, the movable core 15 is engaged with the valving element 12 to start to open the valving element 12.

In the above first embodiment, the entire magnetic circuit region 16b is surrounded by the inner peripheral surface 4a of the attachment hole 4 along the whole circumference. Alternatively, a part of the magnetic circuit region 16b may be surrounded with the inner peripheral surface 4a along the whole circumference. In addition, the entire coil region 16a may be surrounded by the inner peripheral surface 4a of the attachment hole 4 along the whole circumference, or a part of the coil region 16a may be surrounded with the inner peripheral surface 4a along the whole circumference.

The injector 10 of the above first embodiment is attached to the cylinder head 3 as illustrated in FIG. 1. Alternatively, the injector 10 may be an injector that is attached to the cylinder block including a sliding wall surface on which the cylinder slides. Furthermore, in the above embodiments, the injector that injects fuel directly into the combustion chamber 10a is a controlled object. Alternatively, an injector that injects fuel into an intake pipe may be a controlled object.

The above first embodiment is applied to the injector 10 disposed in the ignition-type engine (gasoline engine). Alternatively, the first embodiment may be applied to an injector disposed in a compression self-ignition type internal combustion engine (diesel engine).

The target pressure Ptrg in the case of the gasoline engine is several orders lower than in the case of the diesel engine. For this reason, in the case of the gasoline engine, there is a marked concern that the spray particle diameter at the time of partial injection becomes large because the sack fuel pressure does not rise as soon as the valving element is opened. Therefore, when such a configuration that "the partial injection is chosen if the required injection quantity Qreq is equal to or smaller than the partial maximum injection quantity Qplmax" is applied to the injector of the gasoline engine, the effect of "making small the spray particle diameter" is prominently produced.

The target pressure Ptrg in the case of the gasoline engine is several orders lower than in the case of the diesel engine. For this reason, in the case of the gasoline engine, there is a marked concern that the spray particle diameter at the time of partial injection becomes large because the sack fuel pressure does not rise as soon as the valving element is opened. Thus, when such a configuration that "at the time of partial injection, the target pressure is set at the value that is the lower limit pressure or higher" is applied to the injector of the gasoline engine, the effect of "making small the spray particle diameter" is prominently produced.

Fifth Embodiment

In the above first embodiment, the target supply fuel pressure Ptrg at the time of partial injection is set at the system maximum fuel pressure Pmax (e.g., 20 MPa). In the present embodiment, the target supply fuel pressure Ptrg at the time of partial injection is set at a value that is lower than the system maximum fuel pressure Pmax and is higher than the lower limit pressure. The technical meaning of the lower limit pressure will be described below.

Figure 11:
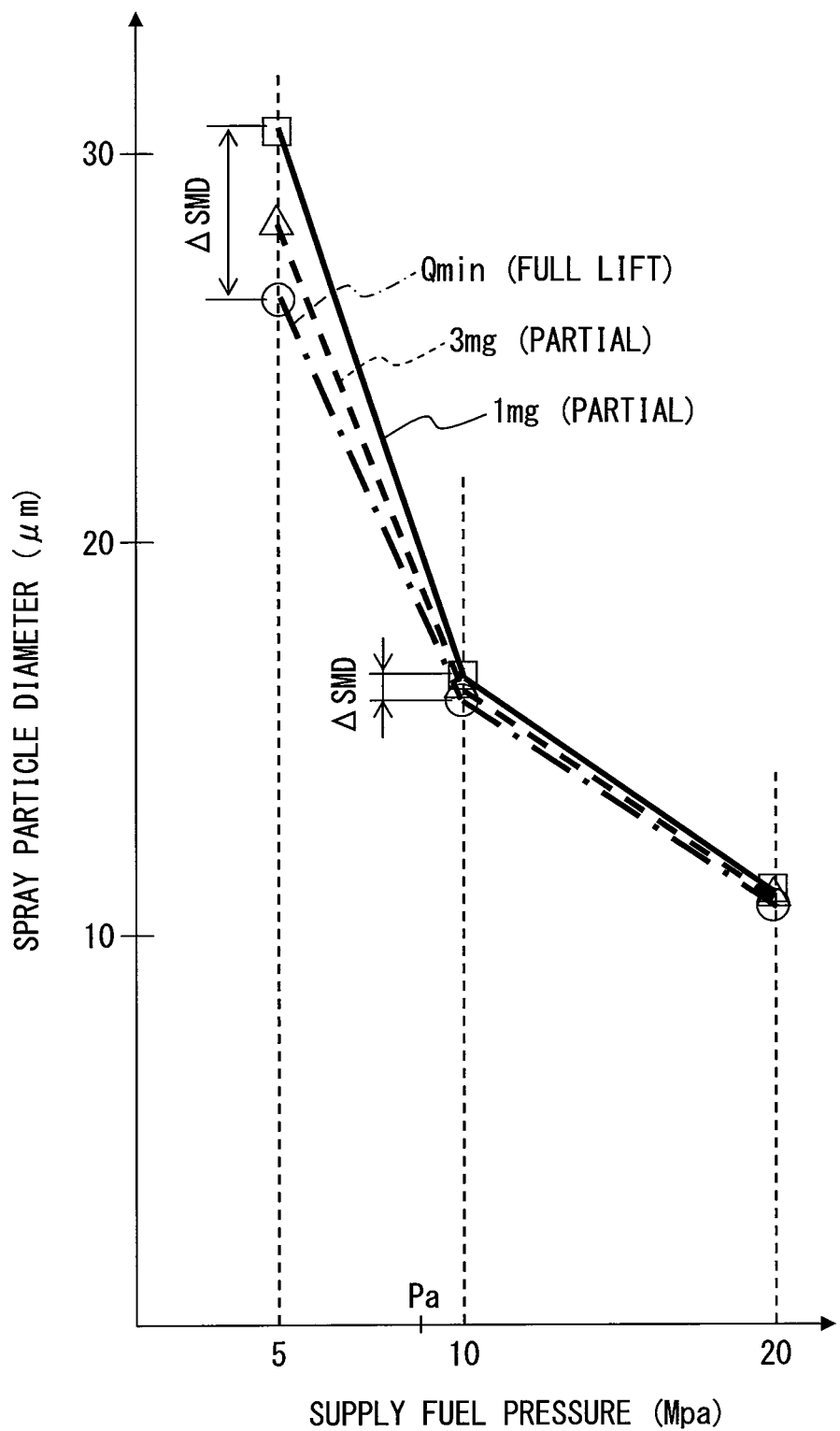
FIG. 11 is a graph illustrating an effect due to a fifth embodiment, which is a test result indicating a relationship between a spray particle diameter and supply fuel pressure.

FIG. 11 illustrates a test result indicating a relationship between the spray particle diameter and the supply fuel pressure, and is a result of examination carried out at three points: 5 MPa, 10 MPa, 20 MPa. In FIG. 11, a continuous line indicates a test result in a case of the partial injection of 1 mg of fuel; a dashed line indicates a test result in a case of the partial injection of 3 mg of fuel; and an alternate long and short dash line indicates a test result in a case of full lift injection of the minimum injection quantity Qmin of fuel. A hardware structure of a fuel injection system used in this examination is the same as the fuel injection system of the first embodiment.

As illustrated in FIG. 11, basically, in the case of partial injection, the spray particle diameter becomes larger than the case of full lift injection. Particularly, at 5 MPa, the spray particle diameter becomes large by approximately 5 μm. A degree of this increase of the diameter is referred to as the spray particle diameter deterioration rate ΔSMD. However, it is found that the spray particle diameter deterioration rate ΔSMD is small at 10 MPa and that even in the case of the partial injection, a spray particle diameter similar to the full lift injection can be achieved. Even when the supply fuel pressure is increased to 10 MPa or higher, there is little improvement in the spray particle diameter deterioration rate, and there is no room for improvement in the spray particle diameter at pressure higher than 10 MPa.

As described above, a boundary value of the supply fuel pressure where a significant improvement can be made in the spray particle diameter deterioration rate is the above-described lower limit pressure Pa, and even if the supply fuel pressure is raised to be higher than this boundary value, the spray particle diameter deterioration rate can be hardly improved. According to the test result in FIG. 11, the value 10 MPa of the supply fuel pressure is interpreted to be a value that is higher than the lower limit pressure and is lower than the system maximum fuel pressure Pmax.

In the present embodiment with the view to this regard, the target supply fuel pressure Ptrg at the time of partial injection is set at 10 MPa. Consequently, there can be heightened a proportion (output improvement efficiency) of the "output improved amount" due to reduction of the spray particle diameter by the raised supply fuel pressure at the time of partial injection to the "pump loss amount" due to increase of a load of a high-pressure pump 40 by the raised supply fuel pressure. As a result, the output improved amount can be enhanced with the pump loss amount held low.

Sixth Embodiment

In the above fifth embodiment, the target supply fuel pressure Ptrg at the time of partial injection is set at 10 MPa. In the present embodiment, the target supply fuel pressure Ptrg at the time of partial injection is set at the lower limit pressure Pa. The supply fuel pressure corresponding to a changing point P of a characteristic line in FIG. 12 indicates the lower limit pressure Pa. The technical meaning of the changing point P will be described below.

Figure 12:
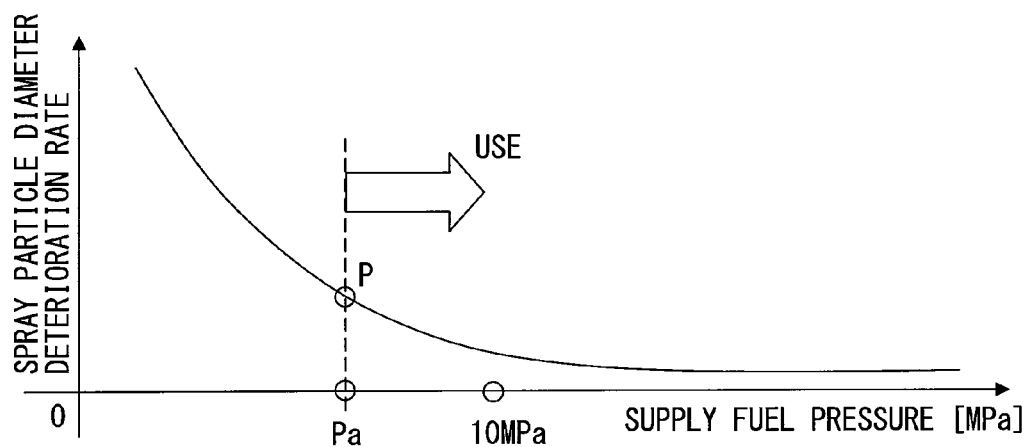
FIG. 12 is a graph illustrating an effect due to a sixth embodiment, which is a result of a numerical analysis indicating a relationship between a spray particle diameter deterioration rate and the supply fuel pressure.

FIG. 11 illustrates the characteristic lines indicating a relationship between the supply fuel pressure and the spray particle diameter, at the three points: 5 MPa, 10 MPa, 20 MPa. By increasing the number of these points for the test, it is manifested through a numerical analysis performed by the inventors that the changing point, at which the second order differential value of the characteristic line is maximized, exists on a part of the characteristic line between 5 MPa and 10 MPa. FIG. 12 illustrates a result of this numerical analysis, with the vertical axis of FIG. 12 indicating the spray particle diameter deterioration rate ΔSMD, the horizontal axis of FIG. 12 indicating the supply fuel pressure. The changing point P in FIG. 12 corresponds to the changing point, at which the second order differential value of the characteristic line is maximized.

In short, the slope of the characteristic line indicating the relationship between the supply fuel pressure and the spray particle diameter becomes more rapid as the supply fuel pressure becomes lower, but does not increase in proportion to the supply fuel pressure. The slope of the line increases exponentially relative to the reduction in supply fuel pressure. A point, at which its increasing speed is maximized, is the above-described changing point P. In other words, a point where the second order differential value of the characteristic line is maximized is the changing point P. The changing point P can be said to be a point where the increasing speed of the slope of the characteristic line is the fastest and the spray particle diameter changes to rapidly become large (deterioration rate becomes large).

In the present embodiment with the view to this regard, with the fuel pressure of the changing point P regarded as the lower limit pressure Pa, the target supply fuel pressure Ptrg at the time of partial injection is set at this lower limit pressure Pa. Accordingly, there can be heightened a proportion (output improvement efficiency) of the "output improved amount" due to reduction of the spray particle diameter by the raised supply fuel pressure at the time of partial injection to the "pump loss amount" due to increase of a load of a high-pressure pump 40 by the raised supply fuel pressure. As a result, the output improved amount can be enhanced with the pump loss amount held low.

Seventh Embodiment

The present embodiment relates to the case of implementation of the divided injection whereby fuel is injected with the required injection quantity Qreq divided among multiple times during one combustion cycle. In controlling the fuel discharged amount of the high-pressure pump 40 to control the supply fuel pressure to be the target fuel pressure Ptrg, there is a response delay in control. For this reason, even if the target fuel pressure Ptrg is changed for each of the injections of multiple times during one combustion cycle, the actual supply fuel pressure cannot accurately follow (track) the change of the target fuel pressure Ptrg.

In the present embodiment with the view to this regard, upon satisfaction of the conditions (S10: YES, S11: YES) for selection of the partial injection by at least one of the injections of multiple times during one combustion cycle, the target pressure Ptrg is set at the system maximum fuel pressure Pmax for all the injections of multiple times. Accordingly, even in the case of partial injection related to the divided injection, fuel can be injected with sufficiently high supply fuel pressure to make a small spray particle diameter.

Additionally, in the case of the divided injection, the amount of fuel injected for one injection is very small. Therefore, as a result of the present embodiment applying such a configuration that the target pressure Ptrg is set at the lower limit pressure or higher at the time of partial injection to the fuel injection system configured such that the divided injection is possible, the effect of atomizing the fuel spray at the time of partial injection is markedly produced.

Eighth Embodiment

In the above seventh embodiment, with the satisfaction of the conditions for selection of the partial injection by at least one of the injections of multiple times related to the divided injection as a requirement, the target pressure Ptrg is set at the system maximum fuel pressure Pmax for all the injections of multiple times. In the present embodiment, under the condition that all the injections of multiple times related to the divided injection satisfy the requirements for selection of the partial injection, the target pressure Ptrg is set at the system maximum fuel pressure Pmax for all the injections of multiple times.

In this manner, when the partial injection is performed on all the injections of multiple times, the effect of atomizing the fuel spray is produced multiple times during one combustion cycle. Accordingly, the effect of atomizing the fuel spray is markedly produced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection control device adapted for a fuel injection system including:
   an injector that is provided for an internal-combustion engine and includes a valving element and a nozzle hole, the injector configured to open the valving element and to inject fuel through the nozzle hole; and
   a high-pressure pump configured to raise pressure of fuel and to supply the fuel to the injector, the fuel injection control device comprising:
   a selecting means for selecting by which one of full lift injection and partial injection to inject fuel, wherein:
   by the full lift injection, the valving element starts to be opened, and reaches its full lift position, and then starts to be closed; and
   by the partial injection, the valving element starts to be opened, but does not reach its full lift position, and then starts to be closed; and
   a pump control means for controlling operation of the high-pressure pump such that a pressure of fuel supplied to the injector coincides with a target pressure, wherein:
   a maximum injection quantity of fuel when the partial injection is performed at a maximum value of the target pressure that the fuel injection system is capable of taking is referred to as a partial maximum injection quantity of fuel; and
   the selecting means selects the partial injection when a required injection quantity of fuel is equal to or smaller than the partial maximum injection quantity.

2. The fuel injection control device according to claim 1, wherein:
   the high-pressure pump is a mechanical pump that is driven by rotary torque of the engine;
   an amount of improvement in output efficiency of the engine due to a reduction of a spray particle diameter of fuel as a result of the selection of the partial injection is referred to as an output improved amount;
   an amount of reduction in the output efficiency of the engine due to an increase of a load of the high-pressure pump as a result of the selection of the partial injection is referred to as a pump loss amount; and
   the selecting means selects the partial injection under condition that the output improved amount is larger than the pump loss amount.

3. The fuel injection control device according to claim 2, wherein at time of starting of the engine, the selecting means regards the pump loss amount as larger than the output improved amount.

4. The fuel injection control device according to claim 1, further comprising:
   a detecting means for detecting valve-closing timing of the valving element;
   an injection data obtaining means for calculating an actual injection quantity of fuel by the partial injection based on the valve-closing timing detected when the partial injection is performed and for obtaining injection data indicating a relationship between a valve-opening command period of the valving element and the actual injection quantity; and
   an injection command period setting means for setting a period in which to command the injector to open the valving element based on the required injection quantity and the injection data.

5. The fuel injection control device according to claim 1, wherein:
   the injector further includes:
   a coil;
   a fixed core configured to generate electromagnetic attractive force upon energization of the coil; and
   a movable core configured to be attracted to the fixed core and to be displaced together with the valving element; and
   the injector is configured such that the valving element also starts to open the nozzle hole simultaneously with a start of the displacement of the movable core.

6. The fuel injection control device according to claim 1, wherein the injector is structured such that a flow passage length of the nozzle hole is smaller than an inlet diameter of the nozzle hole.

7. The fuel injection control device according to claim 1, wherein when the engine is in idle operation, the selecting means regards the required injection quantity as equal to or smaller than the partial maximum injection quantity.

8. The fuel injection control device according to claim 1, wherein:
   the injector is disposed at a position where the injector injects fuel directly into a combustion chamber of the engine; and
   the engine is an ignition-type internal-combustion engine that ignites and combusts fuel by an ignition device of the engine.

9. The fuel injection control device according to claim 1, wherein:
   the injector further includes:
   a coil;
   a fixed core that forms a part of a magnetic circuit configured as a passage for a magnetic flux produced upon energization of the coil and that produces electromagnetic force;
   a movable core that is attracted by the electromagnetic force to be displaced together with the valving element; and
   a housing that is inserted and attached in an attachment hole formed at a predetermined position of the engine and that accommodates therein the coil;
   the housing has a cylindrical shape that forms a part of the magnetic circuit configured as the passage for the magnetic flux produced upon energization of the coil;
   a region of the housing that accommodates the coil is referred to as a coil region; and an outer peripheral surface of at least a part of the coil region is surrounded with an inner peripheral surface of the attachment hole along its whole circumference.

10. A fuel injection system comprising:
the fuel injection control device recited in claim 1;
the injector; and
the high-pressure pump.

11. A fuel injection control device adapted for a fuel injection system including:
an injector that is provided for an internal-combustion engine and includes a valving element and a nozzle hole, the injector configured to open the valving element and to inject fuel through the nozzle hole; and
a high-pressure pump configured to raise pressure of fuel and to supply the fuel to the injector, the fuel injection control device comprising:
a selecting means for selecting by which one of full lift injection and partial injection to inject fuel, wherein:
by the full lift injection, the valving element starts to be opened, and reaches its full lift position, and then starts to be closed; and
by the partial injection, the valving element starts to be opened, but does not reach its full lift position, and then starts to be closed;
a pump control means for controlling operation of the high-pressure pump such that a pressure of fuel supplied to the injector coincides with a target pressure; and
a target pressure setting means for setting the target pressure according to an operating condition of the engine when the full lift injection is selected, and for setting the target pressure at a value that is a preset lower limit pressure or higher when the partial injection is selected.

12. The fuel injection control device according to claim 11, wherein:
a relationship between the pressure of fuel supplied to the injector and a spray particle diameter of fuel injected through the nozzle hole is expressed by a characteristic line;
a changing point, at which a second order differential value of the characteristic line is maximized, exists on the characteristic line; and
the lower limit pressure is set at a pressure value at the changing point.

13. The fuel injection control device according to claim 12, wherein the value that is the lower limit pressure or higher is set at a maximum value of the target pressure that the fuel injection system is capable of taking.

14. The fuel injection control device according to claim 11, wherein:
the high-pressure pump is a mechanical pump that is driven by rotary torque of the engine;
an amount of improvement in output efficiency of the engine due to a reduction of a spray particle diameter of fuel as a result of the selection of the partial injection is referred to as an output improved amount;
an amount of reduction in the output efficiency of the engine due to an increase of a load of the high-pressure pump as a result of the selection of the partial injection is referred to as a pump loss amount; and
the selecting means selects the partial injection under condition that the output improved amount is larger than the pump loss amount.

15. The fuel injection control device according to claim 14, wherein at time of starting of the engine, the selecting means regards the pump loss amount as larger than the output improved amount.

16. The fuel injection control device according to claim 11, further comprising:
a detecting means for detecting valve-closing timing of the valving element;
an injection data obtaining means for calculating an actual injection quantity of fuel by the partial injection based on the valve-closing timing detected when the partial injection is performed and for obtaining injection data indicating a relationship between a valve-opening command period of the valving element and the actual injection quantity; and
an injection command period setting means for setting a period in which to command the injector to open the valving element based on a required injection quantity of fuel and the injection data.

17. The fuel injection control device according to claim 11, wherein:
the injector further includes:
a coil;
a fixed core configured to generate electromagnetic attractive force upon energization of the coil; and
a movable core configured to be attracted to the fixed core and to be displaced together with the valving element; and
the injector is configured such that the valving element also starts to open the nozzle hole simultaneously with a start of the displacement of the movable core.

18. The fuel injection control device according to claim 11, wherein the injector is structured such that a flow passage length of the nozzle hole is smaller than an inlet diameter of the nozzle hole.

19. The fuel injection control device according to claim 11, wherein:
a maximum injection quantity of fuel when the partial injection is performed at a maximum value of the target pressure that the fuel injection system is capable of taking is referred to as a partial maximum injection quantity of fuel; and
the selecting means selects the partial injection under condition that a required injection quantity of fuel is equal to or smaller than the partial maximum injection quantity.

20. The fuel injection control device according to claim 19, wherein when the engine is in idle operation, the selecting means regards the required injection quantity as equal to or smaller than the partial maximum injection quantity.

21. The fuel injection control device according to claim 11, wherein in a case of implementation of divided injection whereby fuel is injected with a required injection quantity of fuel divided among a plurality of times during one combustion cycle of the engine, the target pressure setting means sets the target pressure at the value that is the lower limit pressure or higher for all the plurality of times of injections upon satisfaction of a condition for the selection of the partial injection by at least one of the plurality of times of injections.

22. The fuel injection control device according to claim 11, wherein in a case of implementation of divided injection whereby fuel is injected with a required injection quantity of fuel divided among a plurality of times during one combustion cycle of the engine, the target pressure setting means sets the target pressure at the value that is the lower limit pressure or higher for all the plurality of times of injections upon satisfaction of a condition for the selection of the partial injection by all the plurality of times of injections.

23. The fuel injection control device according to claim 11, wherein:
the injector further includes:
a coil;
a fixed core that forms a part of a magnetic circuit configured as a passage for a magnetic flux produced upon energization of the coil and that produces electromagnetic force;
a movable core that is attracted by the electromagnetic force to be displaced together with the valving element; and
a housing that is inserted and attached in an attachment hole formed at a predetermined position of the engine and that accommodates therein the coil;
the housing has a cylindrical shape that forms a part of the magnetic circuit configured as the passage for the magnetic flux produced upon energization of the coil;
a region of the housing that accommodates the coil is referred to as a coil region; and
an outer peripheral surface of at least a part of the coil region is surrounded with an inner peripheral surface of the attachment hole along its whole circumference.

24. The fuel injection control device according to claim 11, wherein:
the injector is disposed at a position where the injector injects fuel directly into a combustion chamber of the engine; and
the engine is an ignition-type internal-combustion engine that ignites and combusts fuel by a spark of an ignition plug of the engine.

25. A fuel injection system comprising:
the fuel injection control device recited in claim 11;
the injector; and
the high-pressure pump.

* * * * *